(12) United States Patent
Hoffman

(10) Patent No.: US 7,210,200 B2
(45) Date of Patent: May 1, 2007

(54) MULTI-AXIS DOOR HINGE

(75) Inventor: Lawrence Andrew Hoffman, Portland, OR (US)

(73) Assignee: The Hoffman Group, LLC, Portland, OR (US)

( * ) Notice: Subject to any disclaimer, the term of this patent is extended or adjusted under 35 U.S.C. 154(b) by 248 days.

(21) Appl. No.: 11/056,136

(22) Filed: Feb. 11, 2005

(65) Prior Publication Data

US 2005/0166363 A1   Aug. 4, 2005

Related U.S. Application Data

(63) Continuation-in-part of application No. 10/396,284, filed on Mar. 25, 2003, now Pat. No. 7,007,346.

(51) Int. Cl.
*E05D 3/10* (2006.01)
*E05D 3/06* (2006.01)

(52) U.S. Cl. .................. 16/367; 16/368; 296/146.17

(58) Field of Classification Search ........... 16/367, 16/368, 294, 366, 287; 49/257, 254; 296/146.11, 296/146.12
See application file for complete search history.

(56) References Cited

U.S. PATENT DOCUMENTS

| | | | |
|---|---|---|---|
| 1,069,505 A | 8/1913 | Wheatley | |
| 2,178,908 A | 11/1939 | Harrington | |
| 2,322,933 A | * 6/1943 | Harmon et al. | ............ 16/278 |
| D150,161 S | 7/1948 | Sanmori | |
| 2,754,537 A | 7/1956 | Rose et al. | |
| 2,775,478 A | 12/1956 | Stimetz et al. | |
| 3,589,069 A | 6/1971 | Lecomte | |
| 3,594,853 A | 7/1971 | Slattery | |
| 3,628,216 A | 12/1971 | Savell et al. | |
| 3,870,361 A | 3/1975 | Krause | |
| 4,513,475 A | 4/1985 | Fenton | |
| 4,684,167 A | 8/1987 | Newmayer | |
| 4,692,964 A | 9/1987 | DeBruyn | |
| 4,719,665 A | 1/1988 | Bell | |
| 4,776,626 A | 10/1988 | Seyler | |

(Continued)

FOREIGN PATENT DOCUMENTS

DE        4319662        2/1994

(Continued)

OTHER PUBLICATIONS

WO 2004/048138 A2, Mcrobert, Jun. 2004.*

*Primary Examiner*—Brian E. Glessner
*Assistant Examiner*—Mark Williams
(74) *Attorney, Agent, or Firm*—Silicon Forest Patent Group; Paul J Fordenbacher, Esq.

(57) ABSTRACT

A multi-axis automobile door hinge, comprising a first leaf, a second leaf, and a third leaf. The first leaf and the second leaf are pivotally coupled defining a swing-out hinge adapted so as to enable rotation in a substantially horizontal plane about a substantially vertical axis of rotation. The second leaf and the third leaf are pivotally coupled about a lift bearing defining a vertical-lift hinge adapted so as to enable rotation in a substantially vertical plane about a substantially horizontal axis of rotation. The multi-axis automobile door hinge provides a combination of swing-out and vertical-lift motion suitable for retrofitting a conventional swing-out automobile door for swing-out and vertical-lift operation.

23 Claims, 24 Drawing Sheets

U.S. PATENT DOCUMENTS

| | | | |
|---|---|---|---|
| 4,801,172 | A | 1/1989 | Townsend |
| 5,035,463 | A | 7/1991 | Kato et al. |
| 5,074,609 | A | 12/1991 | Dear |
| 5,261,720 | A | 11/1993 | Lomax, Jr. et al. |
| 5,265,311 | A | 11/1993 | Gard |
| 5,600,868 | A | 2/1997 | Tourville et al. |
| 5,918,347 | A | 7/1999 | Morawetz |
| 6,000,747 | A | 12/1999 | Sehgal et al. |
| 6,086,137 | A | 7/2000 | Leschke et al. |
| 6,175,991 | B1 | 1/2001 | Driesman et al. |
| 6,178,593 | B1 | 1/2001 | Carlson |
| 6,256,837 | B1 | 7/2001 | Lan et al. |
| 6,314,615 | B1 | 11/2001 | Wolda |
| 6,447,043 | B1 | 9/2002 | VandenHeuvel et al. |
| 6,629,377 | B2 | 10/2003 | Taraschuk |
| 6,676,193 | B1 | 1/2004 | Hanagan |
| 6,808,223 | B1 * | 10/2004 | Baum et al. ............ 296/146.12 |
| 6,845,547 | B2 | 1/2005 | Ham |
| 7,048,322 | B2 * | 5/2006 | DeBono ................. 296/146.11 |
| 7,059,655 | B2 * | 6/2006 | Ham ..................... 296/146.12 |
| 7,140,075 | B2 * | 11/2006 | Ham ........................... 16/374 |
| 2004/0244144 | A1 | 12/2004 | Ham |
| 2005/0022342 | A1 | 2/2005 | Ham |
| 2005/0204511 | A1 * | 9/2005 | Wohlfarth .................... 16/367 |

FOREIGN PATENT DOCUMENTS

| | | |
|---|---|---|
| FR | 493225 | 7/1992 |
| JP | 402299926 | 12/1990 |

* cited by examiner

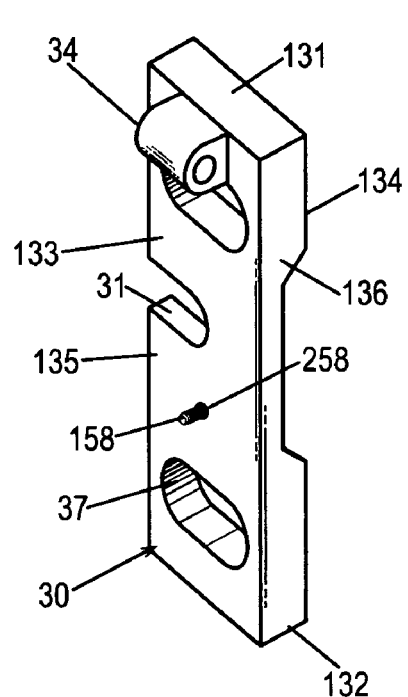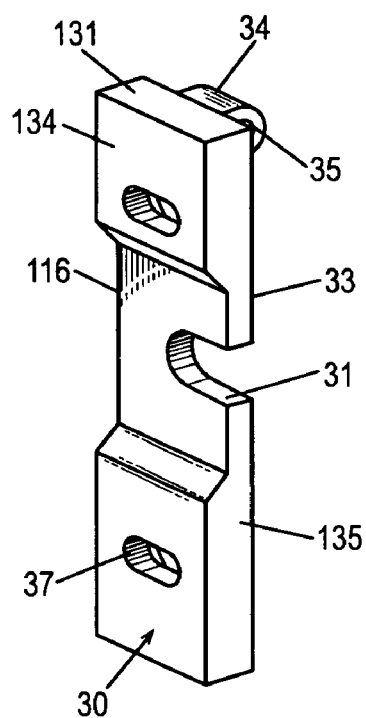
FIG. 6A                FIG. 6B
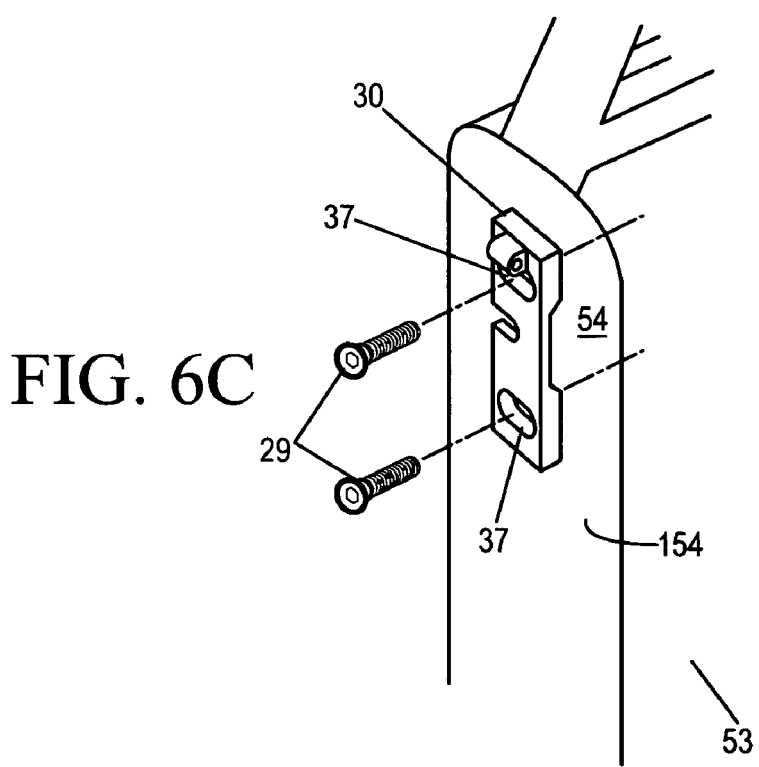
FIG. 6C

MULTI-AXIS DOOR HINGE

RELATED APPLICATION

This application is a continuation-in-part application claiming benefit under 35 U.S.C. § 121 of U.S. non-provisional application Ser. No. 10/396,284, filed Mar. 25, 2003 now U.S. Pat. No. 7,007,346, incorporated herein in its entirety by reference.

FIELD OF THE INVENTION

This invention relates to automobile doors that open vertically upward, and more particularly, to multi-axis door hinge components and swing-out vertical-lift door assemblies with independent function characteristics.

BACKGROUND OF INVENTION

One aspect of the automobile that has changed little is the swing-out door. The swing-out door is suspended from the automobile body using conventional single-axis hinges. Each single-axis hinge comprises two leaves; a stationary leaf that is usually mounted on a forward portion of a doorjamb, and a hinge leaf that is usually mounted on a forward portion of a door edge. Each leaf comprises one or more knuckles which have coaxial through bores. The knuckles of two leaves are interleaved such that the through bores are placed in coaxial alignment. The leaves are rotatably joined together with a hinge pin extending through the bores.

The conventional single-axis hinge permits rotation within one plane. As the door is opened, the rear door edge swings out from the side of the automobile in a substantially horizontal plane, whereby a space for stepping-in and stepping-out is formed between the rear door edge and the automobile body. A major issue with swing-out doors is the situation of tight parking spaces with little room for the door to swing open to allow ingress and egress. Also, the potential for damage to an adjacent automobile is a persistent problem resulting in the inevitable door ding.

Other door opening configurations have been tried, such as sliding, gull wing, and vertical-lift doors. Sliding doors are popular on vans, but not automobiles. The single-axis hinges of the gull wing door are mounted along the upper door edge, the door forming a portion of the roof, and permits rotation of the door above the automobile; a design made famous by DeLorian Motor Company. The single-axis hinge of the vertical-lift door, which is also known as the lambo, scissors, or jack-knife door, is mounted in the forward upper door corner which permits door rotation substantially within a vertical plane defined by the door; a design made famous by Lamborghini.

The advantages of the vertical-lift door are both functional and aesthetic. Since the rotation of the door is upward and not sideways as with the common swing-out door, ingress and egress is greatly facilitated in closely-spaced parking situations. The vertical-lift door eliminates the potential of banging the door against an object located to the side of the automobile. The vertical-lift door also adds a sense of style and luxury to the automobile.

For the most part, vertical-lift doors have been available only on expensive luxury performance automobiles and automobiles assembled from a kit by the consumer. These vehicles have door and door jam configurations, single-axis hinges, and latching mechanisms specifically designed into the automobile to permit the door to open vertically.

Many automobile enthusiasts consider it highly desirable to incorporate exotic features into their ordinary stock automobiles. The vertical-lift door is one such feature that has for the most part been out of reach of the aftermarket enthusiast. Retrofitting the conventional door to operate as a vertical-lift door is difficult to impossible due in part to door and automobile body style. Many automobile body styles incorporate doors with contoured surfaces that would collide with the automobile body if opened as a vertical-lift door.

In some automobile body styles, the bottom edge of the door undercuts the automobile body and therefore would prevent vertical rotation of the door. Other automobile body styles incorporate roof structures that overhang the top edge of the door, precluding vertical rotation of the door.

These and other issues hinder the availability of aftermarket components that would permit the automobile enthusiast to retrofit the conventional swing-out door to operate as a vertical-lift door. These issues also hinder the automobile manufacturers from incorporating vertical-lift doors in automobiles without requiring major redesign of the current automobile body styles which may or may not be aesthetically pleasing to the customer.

It would, therefore, be highly desirable to have components and assemblies that would provide automobile manufacturers and aftermarket enthusiasts the ability to incorporate the motion of the vertical-lift door in currently designed automobiles without major modification to the automobile body or door structures.

SUMMARY

A multi-axis automobile door hinge, comprising a first leaf, a second leaf, and a third leaf. The first leaf and the second leaf are pivotally coupled defining a swing-out hinge adapted so as to enable rotation in a substantially horizontal plane about a substantially vertical axis of rotation. The second leaf and the third leaf are pivotally coupled about a lift bearing defining a vertical-lift hinge adapted so as to enable rotation in a substantially vertical plane about a substantially horizontal axis of rotation. The multi-axis automobile door hinge provides a combination of swing-out and vertical-lift motion suitable for retrofitting a conventional swing-out automobile door for swing-out and vertical-lift operation.

The multi-axis automobile door hinge wherein the first leaf is adapted for coupling to a hinge mount body surface of a doorjamb of an automobile, the third leaf is adapted for coupling to a hinge mount door surface of a door, and the swing-out hinge adapted to provide rotation of the door within a substantially horizontal plane and the vertical-lift hinge adapted to provide rotation of the door within a substantially vertical plane.

The multi-axis automobile door hinge wherein the second leaf and the third leaf are adapted to pivot to an angle greater than 180 .degrees.

The multi-axis automobile door hinge further comprising a lift hinge retention element extending from the first leaf defining a predetermined angle .delta. The lift hinge retention element is adapted to restrict the vertical motion of the vertical-lift hinge until the swing-out hinge has opened equal to or greater than angle .delta. The lift hinge retention element comprising a first engagement surface adjacent the lift arm when the lift arm is in the down position, the first engagement surface adapted for cooperative engagement with the lift arm to restrict the function of the vertical-lift hinge until the swing angle of the second hinge leaf exceeds the predetermined angle .delta. The lift hinge retention element terminating at a second engagement surface adapted for cooperative engagement with the lift arm when the swing angle of the second leaf is at the predetermined angle .delta. and the lift arm is rotated greater than a minimum lift angle .beta., so as to restrict the function of the swing hinge when the lift arm is pivoted greater than the minimum lift angle .beta.

The multi-axis automobile door hinge, wherein the lift hinge retention element further comprises a third engagement surface opposite the first engagement surface. The third engagement surface is adapted such that when the lift arm is rotated a predetermined angle .beta. or more and the second leaf is pivoted a predetermined angle .delta. or less, the lift arm and the third engagement surface are adapted for cooperative engagement to restrict the third leaf from rotating down to less than the predetermined angle .beta.

BRIEF DESCRIPTION OF DRAWINGS

FIGS. 6A and 6B are front and rear perspective views of a third leaf, in accordance with an embodiment of the present invention;

FIG. 6C is a perspective view of the third leaf coupled to the door, in accordance with an embodiment of the present invention;

DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

In the following detailed description, various terms are used to define various elements of a hinge. Other terms are used in the art to reference the same hinge element. Therefore, it is understood that the present invention is not to be limited by the use of a particular term used in reference to a particular hinge element. The following terminology is used throughout the description: a conventional hinge comprises two leaves, namely a stationary leaf and a hinge leaf, which pivot on a single axis of rotation; a leaf consists generally of a mounting portion, such as, but not limited to, a mounting plate, and one or more knuckles; a knuckle comprises an element, generally circular, having a bore adapted to accept a hinge pin, the knuckle extending from a mounting portion of a leaf; a notch is a space between two adjacent knuckles on one leaf into which a knuckle from a second leaf is positioned and interleaved; a stationary leaf is the leaf which is attached to a non-moving structure, such as a door frame; a hinge leaf is a leaf which is attached to a door; and a hinge pin is generally a rod adapted to pass through the bore of the interleaved knuckles of two leaves to join the leaves together.

In accordance with the present invention, embodiments of multi-axis automobile door mounts are provided that are adapted to facilitate pivotal motion of an automobile door about a substantially vertical axis of rotation for swing-out rotation as well as to facilitate pivotal motion of an automobile door about a substantially horizontal axis of rotation for vertical-lift rotation. In accordance with other aspects of the present invention, embodiments of multi-axis automobile door mount systems are provided that are adapted to facilitate pivotal motion of an automobile door about a substantially vertical axis of rotation for swing-out rotation as well as to facilitate pivotal motion of an automobile door about a substantially horizontal axis of rotation for vertical-lift rotation are provided, in addition to providing assistance with the operation of the automobile door.

Figure 1A:
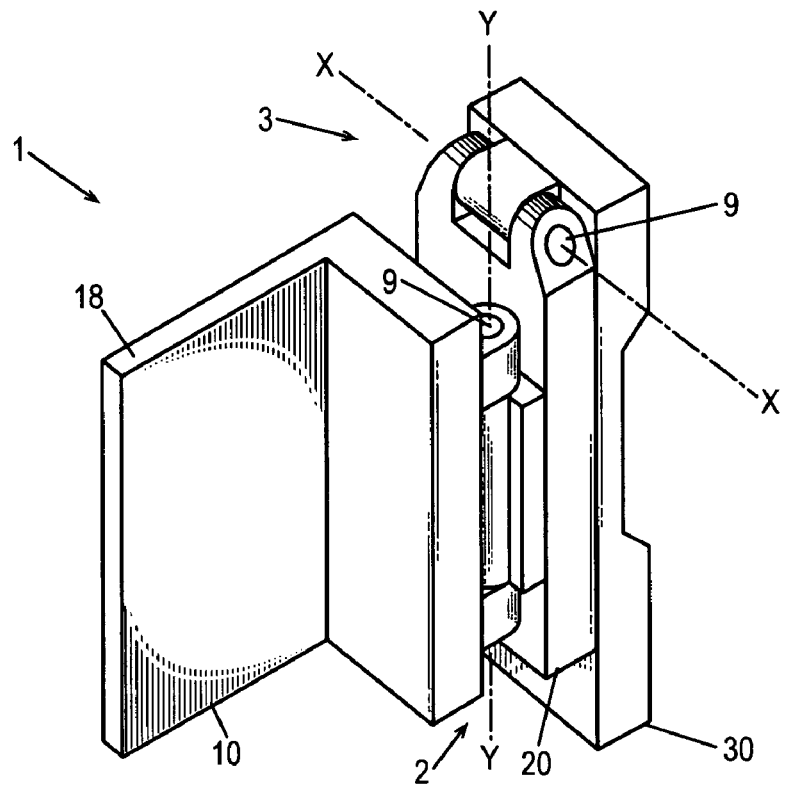
FIG. 1A–1C are front, rear and exploded perspective views of a multi-axis automobile door mount, in accordance with an embodiment of the present invention.
Figure 1B:
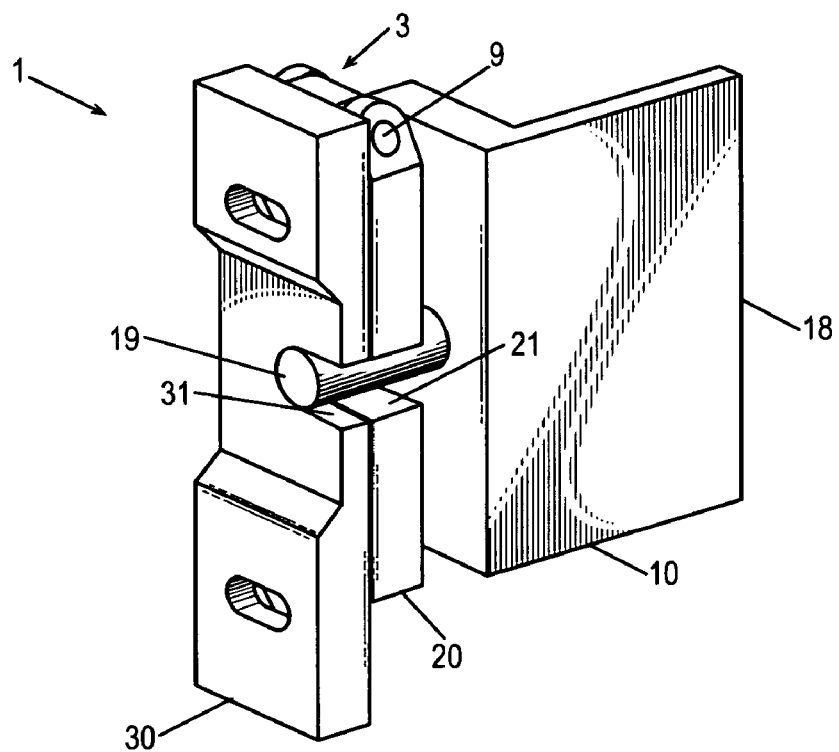
Figure 1C:
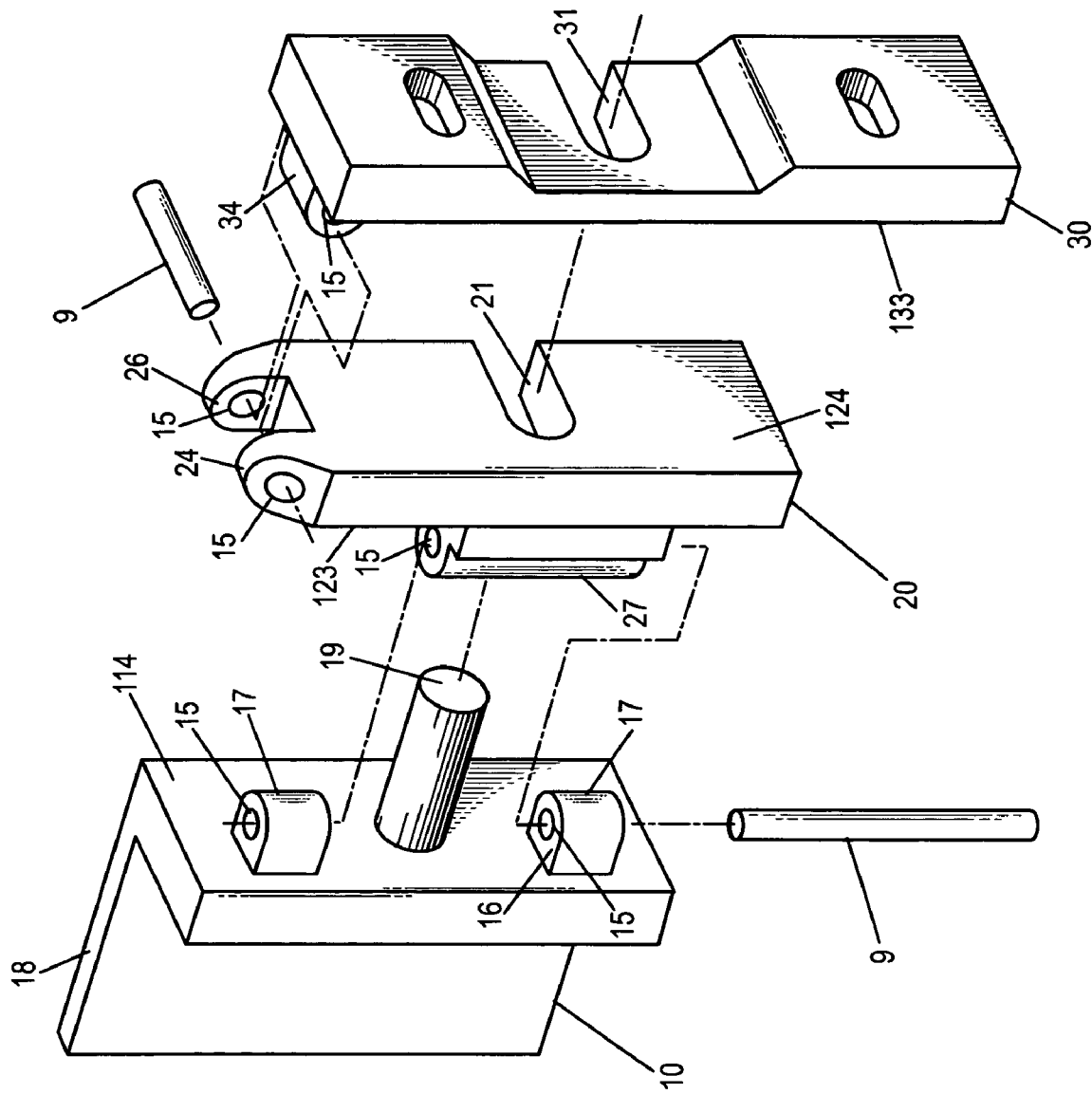
Figure 2A:
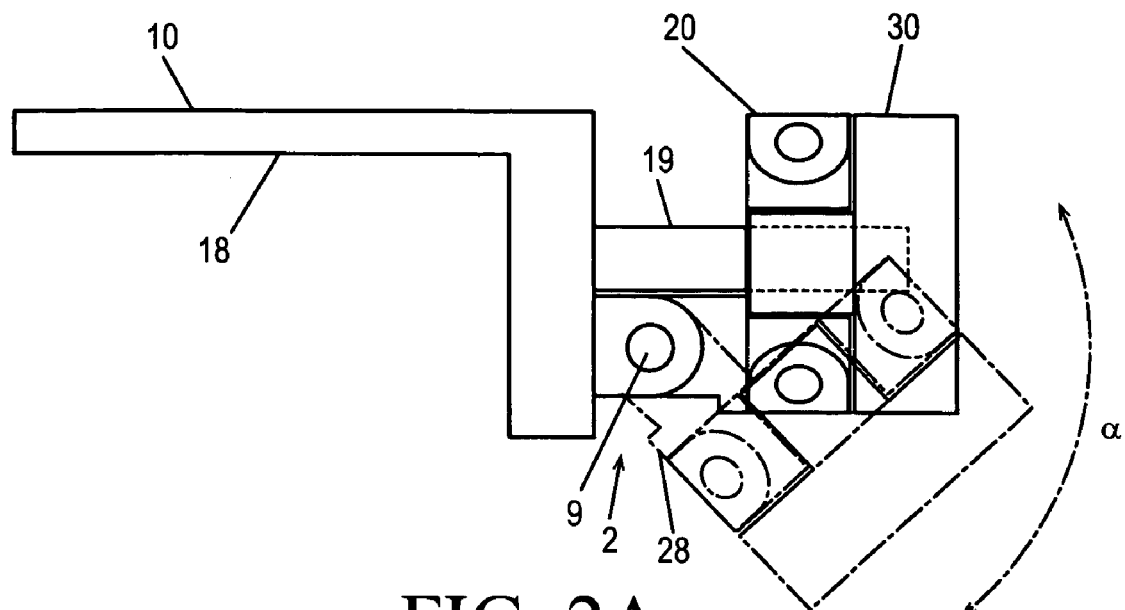
FIG. 2A is a top view of the multi-axis automobile door mount, in accordance with the embodiment of FIG. 1A–1C, illustrating a first leaf and a second leaf joined together with a hinge pin to form a swing-out hinge that allows pivotal movement in the horizontal direction.
Figure 2B:
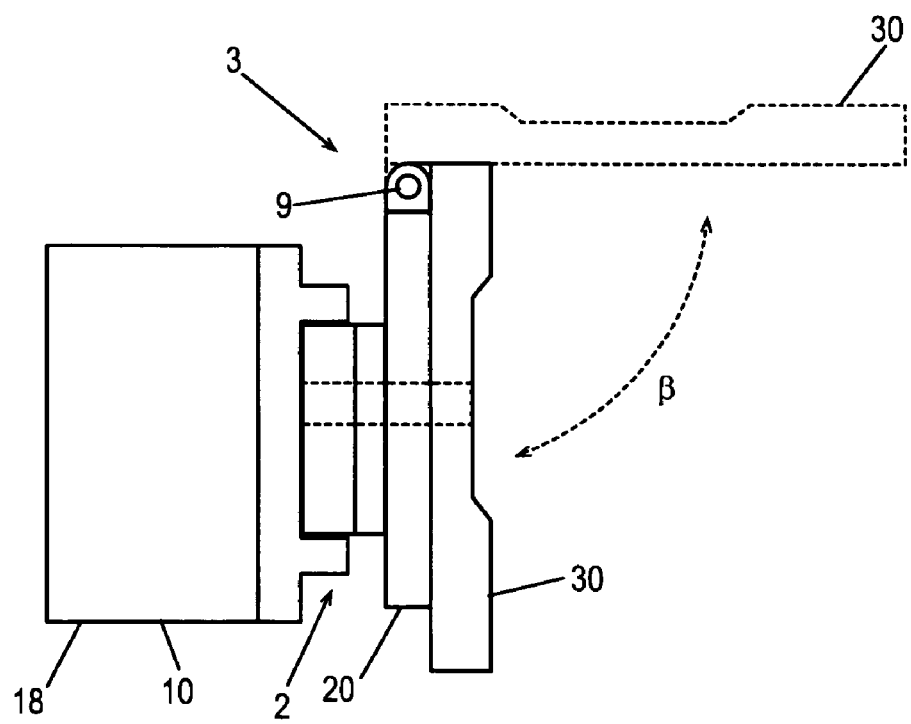
FIG. 2B is a side view of the multi-axis automobile door mount 1, in accordance with the embodiment of FIGS. 1A–1C, illustrating a second leaf and a third leaf joined together with a hinge pin to form a vertical-lift hinge that allows pivotal movement in the vertical direction.

FIGS. 1A–1C are front, rear and exploded perspective views of a multi-axis automobile door mount 1, in accordance with an embodiment of the present invention. The multi-axis automobile door mount 1 comprises a first leaf 10, a second leaf 20, and a third leaf 30. FIG. 2A is a top view of the multi-axis automobile door mount 1 illustrating the first leaf 10 and the second leaf 20 joined together with a hinge pin 9 defining a swing-out hinge 2 that provides rotation in a substantially horizontal plane about a vertical axis of rotation. FIG. 2B is a side view of the multi-axis automobile door mount 1 illustrating the second leaf 20 and the third leaf 30 joined together with a hinge pin 9 defining a vertical-lift hinge 3 that provides rotation in a substantially vertical plane about a horizontal axis of rotation. The multi-axis automobile door mount 1, therefore, provides rotation in a substantially horizontal plane and rotation in a substantially vertical plane, separately, and in combination, to suit a particular purpose.

Figure 3A:
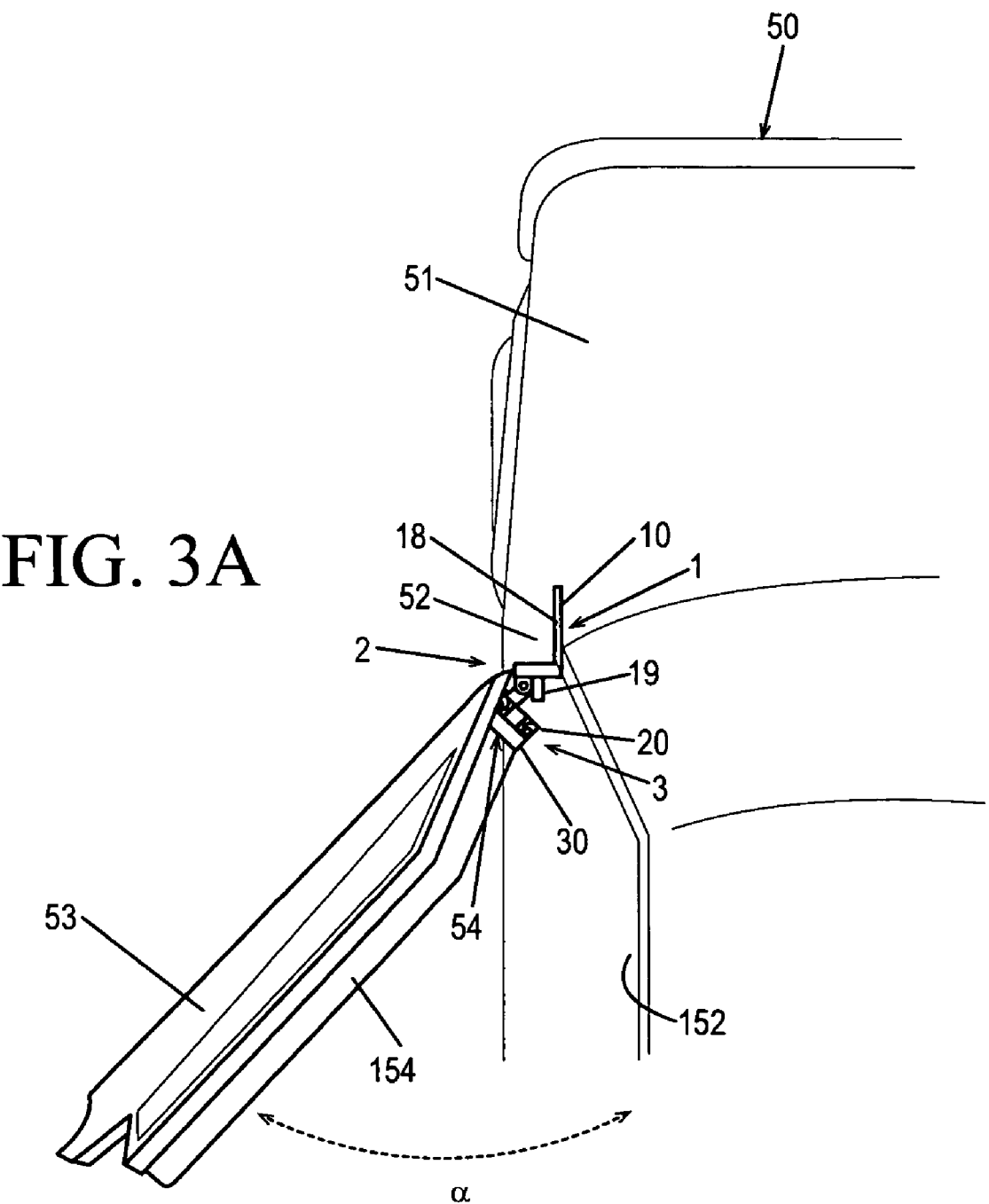
FIGS. 3A and 3B are top and front perspective views, respectively, of an application of the multi-axis automobile door mount as used to provide a door of an automobile with vertical-lift operation, in accordance with an embodiment of the present invention.
Figure 3B:
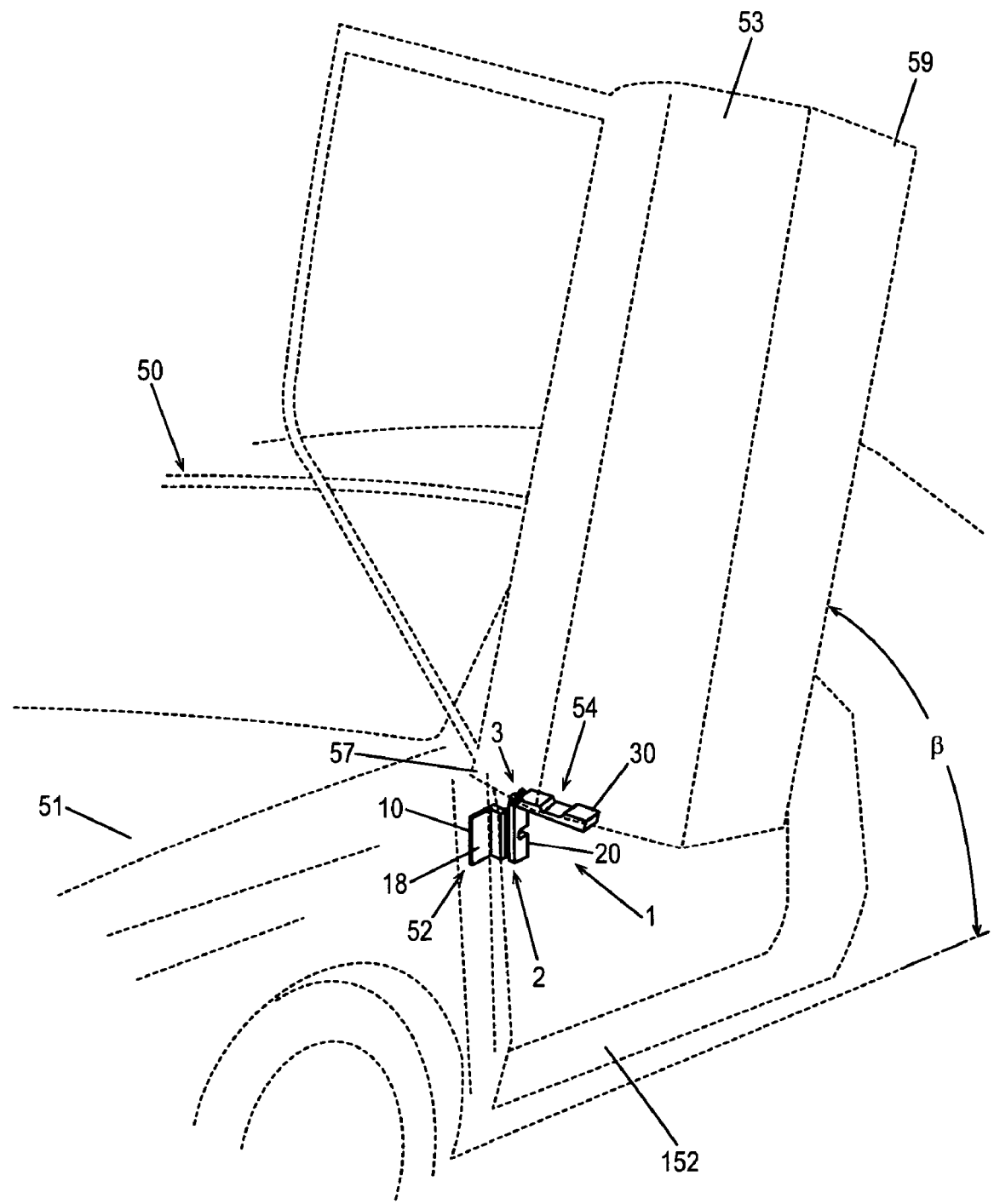

FIGS. 3A and 3B are top and front perspective views, respectively, of an application of the multi-axis automobile door mount 1 as used to provide a door 53 of an automobile 50 with swing-out and vertical-lift operational characteristics, in accordance with an embodiment of the present invention. FIG. 3A is a view from above the automobile 50 showing the left door 53 in a swung-out open position. FIG. 3B is a view from the front left corner of the automobile 50 showing the door 53 in a swung-out vertically lifted open position. The multi-axis automobile door mount 1, in accordance with embodiments of the invention, is useful for passenger automobiles for the front doors as well as for the rear doors (not shown).

In the embodiment of FIGS. 3A–3B, the first leaf 10 is coupled to a hinge mount body surface 52 of a doorjamb 152. The first leaf 10, therefore, is adapted to function as a stationary leaf. The third leaf 30 is coupled to a hinge mount door surface 54 of a door edge 154 to function as a hinge leaf. The second leaf 20 is pivotally coupled about a vertical axis of rotation to the first leaf 10, and pivotally coupled about a horizontal axis of rotation to the third leaf 30 which provides rotation of the door 53 within a substantially horizontal and substantially vertical plane, respectively.

It is contemplated that a wide variety of locations may be used as the hinge mount body surface 52 and the hinge mount door surface 54 as being suitable for a particular purpose. For example, but not limited thereto, the hinge mount door surface 54 is a forward door inner surface. In another embodiment, providing pivoting motion from the rear of the door 53, the hinge mount body surface 52 is a rear portion of the doorjamb 152 and the hinge mount door surface 54 is a rear door edge, providing door opening from the front of the door 53 rather than from the rear.

In yet another embodiment in accordance with the present invention, the hinge mount body surface 52 is that surface vacated by the removal of a stock swing hinge stationary leaf, and the hinge mount door surface 54 is that surface vacated by the removal of the stock swing hinge hinge leaf. This embodiment provides for one for one replacement of the single-axis stock hinge with the multi-axis automobile door mount 1.

The multi-axis automobile door mount 1, as will be discussed below, provides a combination of swing-out and vertical-lift motion necessary for, among other things, the retrofitting of a conventional single-axis swing-out automobile door for swing-out vertical-lift operation. In one embodiment in accordance with the present invention, the door 53 is adapted to open from a closed position in the conventional swing-out rotation about the swing-out hinge 2 within a substantially horizontal plane. At a predetermined angle $\alpha$ of the door 53 to the automobile body 51, the door 53 is adapted to rotate upward about the vertical-lift hinge 3 within a substantially vertical plane to a predetermined lift angle $\beta$. The door 53 is adapted to close by lowering the door 53 to the substantially horizontal orientation and swung-in in the conventional manner.

Figure 4A:
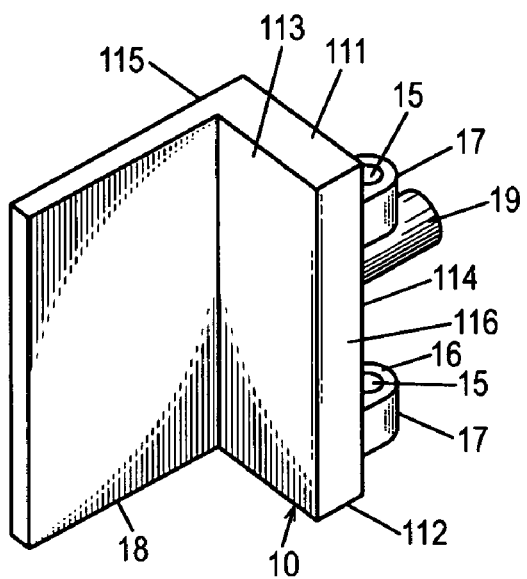
FIGS. 4A and 4B are front and rear perspective views of a first leaf, in accordance with an embodiment of the present invention.
Figure 4B:
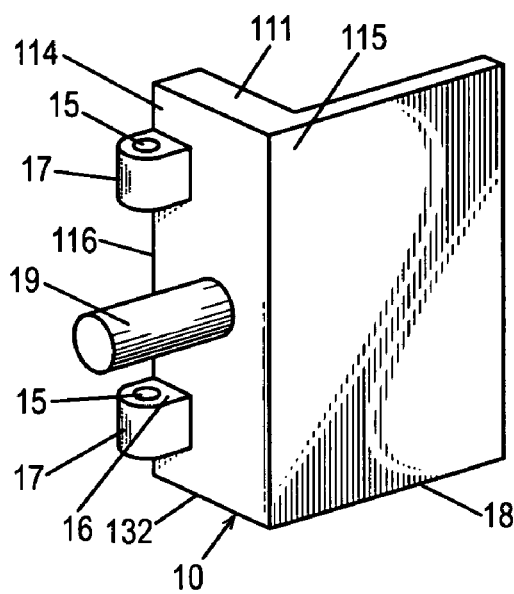

Referring again to FIGS. 1A–1C, the multi-axis automobile door mount 1 comprises a first leaf 10, a second leaf 20, and a third leaf 30. Each leaf is discussed in turn below. FIGS. 4A and 4B are front and rear perspective views of the first leaf 10, in accordance with an embodiment of the present invention. The first leaf 10 comprises a first leaf first end 111, a first leaf second end 112, a first leaf first side 113, a first leaf second side 114, a first leaf first edge 115, and a first leaf second edge 116. Extending from the first leaf second side 114 adjacent the first leaf second edge 116 are two spaced apart first swing knuckles 17 defining a swing notch 16 there between. The first swing knuckles 17 have a generally cylindrical shape each with a bore 15 there through. The axis of the bores 15 are in substantially coaxial alignment and extend substantially parallel to the first leaf second edge 116. The swing notch 16 is adapted to accept a second swing knuckle 27 of the second leaf 20, as will be discussed below.

In one application of the multi-axis automobile door mount 1 as shown in FIGS. 3A and 3B, in accordance with the present invention, the first leaf 10 is the stationary leaf coupled to the hinge mount body surface 52 of the doorjamb 152 of the automobile 50. The hinge mount body surface 52 takes many forms particular to the model of automobile 50, and therefore, the first leaf 10 is adapted to facilitate coupling to a specific hinge mount body surface 52 particular to the automobile 50.

In one embodiment in accordance with the present invention, the first leaf 10 further comprises a coupling portion 18, extending a predetermined distance from the first leaf first side 113 adjacent the first leaf first edge 115. The coupling portion 18 is adapted to be coupled to a structure, such as but not limited to, the hinge mount body surface 52 of the doorjamb 152 of the automobile 50. The coupling portion 18 is coupled to the hinge mount body surface 52 using any number of appropriate coupling means known in the art, including, but not limited to, welding, brazing, and mechanical fastening.

In one embodiment in accordance with the present invention, the coupling portion 18 is adapted to facilitate the provision of a plurality of bolt holes (not shown), such as, but not limited to, those made by the consumer or assembler using a drill, in predetermined locations that correspond to a bolt pattern provided in the hinge mount body surface 52 of the doorjamb 152 of a specific automobile 50 after the removal of the conventional stock hinge.

Figure 4C:
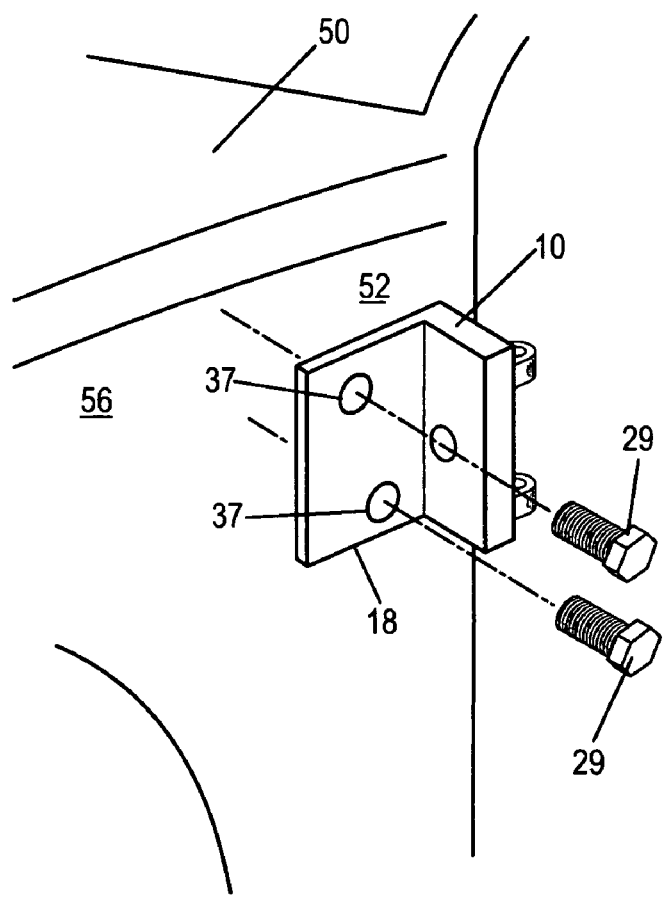
FIG. 4C is a perspective view of the first leaf coupled to the hinge mount body surface, in accordance with an embodiment of the present invention.

FIG. 4C is a front perspective view of the first leaf 10, in accordance with an embodiment of the present invention. The coupling portion 18 is provided with a plurality of bolt holes 37, such as, but not limited to, those made by the consumer or assembler using a drill, in predetermined locations that correspond to the stock bolt hole pattern or a new bolt hole pattern provided in the hinge mount body surface 52 of the doorjamb 152 made by the consumer or assembler. One or more bolts 29 couple the first leaf 10 to the automobile 50.

In another embodiment in accordance with the present invention, the coupling portion 18 is provided with a plurality of bolt holes (not shown) in predetermined locations that correspond to a bolt pattern provided in a hinge mount body surface 52 of the doorjamb 152 of one or more specific model of automobile 50 after the removal of the conventional stock hinge, negating the need for the consumer or assembler to provide the bolt hole pattern in the multi-axis automobile door mount 1.

In yet another embodiment in accordance with the present invention, the coupling portion 18 is provided with a plurality of elongated bolt holes (not shown, but similar to those shown in FIG. 6A) in predetermined locations that correspond to one or more bolt patterns provided in the hinge mount body surface 52 of the doorjamb 152 of one or more specific model of automobile 50 after the removal of the conventional stock hinge. The elongated bolt holes allow for, among other things, accommodation of mal-aligned bolt hole patterns and applicability across a plurality of models of automobile.

The specific configuration of the first leaf 10 to permit coupling to an automobile surface is dependent on a specific automobile under consideration. Therefore, it is understood that other leaf configurations are anticipated that are adapted to couple to an automobile's particular body and/or door surface while retaining the mechanical function of a multi-axis automobile door mount, as provided herein.

Figure 5A:
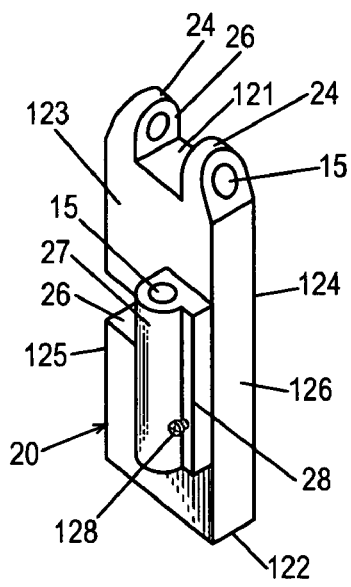
FIGS. 5A and 5B are front and rear perspective views of a second leaf, in accordance with an embodiment of the present invention.
Figure 5B:
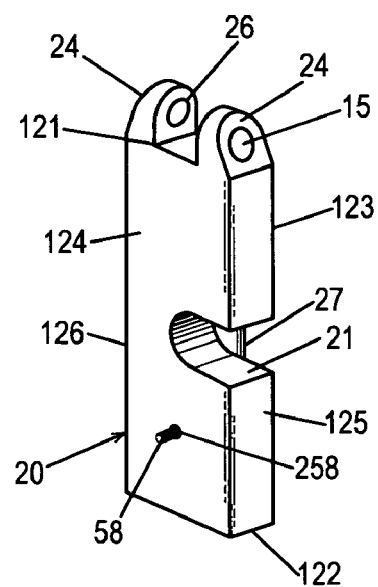

FIGS. 5A and 5B are front and rear perspective views of the second leaf 20, in accordance with an embodiment of the present invention. The second leaf 20 comprises a second leaf first end 121, a second leaf second end 122, a second leaf first side 123, a second leaf second side 124, a second leaf first edge 125, and a second leaf second edge 126. A second swing knuckle 27 extends from the second leaf first side 123 and adjacent to the second leaf second edge 126. The second swing knuckle 27 has a generally cylindrical shape with a bore 15 there through. The axis of the bore 15 extends substantially parallel with the second leaf second edge 126. The second swing knuckle 27 of the second leaf 20 is adapted to be interleaved within the swing notch 16 of the first leaf 10 with the axis of the bores 15 is substantially coaxial alignment, as discussed below.

Two spaced-apart first lift knuckles 24 extend from the second leaf first end 121 defining a lift notch 26 there between. The first lift knuckles 24 have a generally cylindrical shape, each with a bore 15 there through. The bores 15 are substantially coaxial and extend substantially parallel to the second leaf first end 121. The lift notch 26 is adapted to accept a second lift knuckle 34 of the third leaf 30, as discussed below.

FIG. 6A and 6B are front and rear perspective views, respectively, of the third leaf 30, in accordance with an embodiment of the present invention. The third leaf 30 comprises a third leaf first end 131, a third leaf second end 132, a third leaf first side 133, a third leaf second side 134, a third leaf first edge 135, and a third leaf second edge 136. A second lift knuckle 34 extends from the third leaf first side 133 adjacent the third leaf first end 131. The second lift knuckle 34 has a generally cylindrical shape with a bore 15 there through. The bore 15 extends substantially parallel with the third leaf first end 131. The second lift knuckle 34 is adapted to be coaxially positioned or interleaved within the lift notch 26 of the second leaf 20, as discussed below.

The third leaf 30 is coupled to the hinge mount door surface 54 of the door edge 154 using any number of appropriate coupling means known in the art, including, but not limited to, welding, brazing, and mechanical fastening. FIG. 6C is a perspective view of an embodiment of the third leaf 30 coupled to the door 53, in accordance with the present invention. The third leaf 30 is provided with a plurality of bolt holes 37 in predetermined locations that correspond to a bolt pattern provided in a hinge mount door surface 54 of the door edge 154 of one or more specific model of automobile after the removal of the conventional stock hinge. The third leaf 30 is coupled to the hinge mount door surface 54 with one or more bolts 29.

In another embodiment in accordance with the present invention, the third leaf 30 is adapted to be provided with a plurality of bolt holes (not shown), such as, but not limited to, those made by the consumer or assembler using a drill, in predetermined locations that correspond to a bolt pattern provided in the hinge mount door surface 54 of the door edge 154 of a specific automobile 50 after the removal of the conventional stock hinge.

In another embodiment in accordance with the present invention, the third leaf 30 is adapted to be provided with a plurality of bolt holes (not shown), such as, but not limited to, those made by the consumer or assembler using a drill, in predetermined locations that correspond to a new bolt hole pattern provided in the hinge mount door surface 54 of the door edge 154.

In yet another embodiment in accordance with the present invention, the third leaf 30 is provided with a plurality of elongated bolt holes 37 in predetermined locations that correspond to one or more bolt patterns such as those provided in the hinge mount door surface 54 of the door edge 154 across one or more specific model of automobile after the removal of the conventional stock hinge. The elongated bolt holes 37 allow, among other things, for accommodation of mal-aligned bolt hole patterns and applicability across a plurality of models of automobile 50.

In another embodiment in accordance with the present invention, the third leaf 30 is provided with a plurality of bolt holes (not shown) in predetermined locations that correspond to a bolt pattern provided in a hinge mount door surface 54 of one or more specific model of automobile 50 after the removal of the conventional stock hinge, negating the need for the consumer or assembler to provide the bolt hole pattern in the multi-axis automobile door mount 1.

As stated previously, the specific configuration of a first leaf 10 and/or a third leaf 30 to permit coupling to a hinge mount body surface 52 and/or hinge mount door surface 54, respectively, is dependent on the specific automobile under consideration. Therefore, it is understood that other leaf configurations are anticipated that are adapted to couple to an automobile's particular body and/or door surface while retaining the mechanical function of the multi-axis automobile door mount 1 as provided herein.

Referring again to FIGS. 1A–1C, in accordance with an embodiment of the present invention, the multi-axis automobile door mount 1 is assembled such that the first leaf second side 114 is adjacent the second leaf first side 123. The swing notch 16, defined by the two spaced apart first swing knuckles 17, is adapted to accept the second swing knuckle 27 of the second leaf 20 there between. The second swing knuckle 27 is interleaved with the two first swing knuckles 17 such that the bores 15 are substantially coaxial to form a substantially continuous bore adapted to slidably receive the hinge pin 9. A swing hinge 2 is defined herein as the first leaf 10 coupled with the second leaf 20 with the hinge pin 9. The swing hinge 2 is adapted to rotate about a substantially vertical axis and open to a predetermined swing angle α, as shown in FIG. 2A.

The multi-axis automobile door mount 1 is further assembled such that the second leaf second side 124 is adjacent the third leaf first side 133. The lift notch 26, defined by the two spaced apart first lift knuckles 24, is adapted to accept the second lift knuckle 34 of the third leaf 30 there between. The second lift knuckle 34 is interleaved with the two first lift knuckles 24 such that the bores 15 are substantially coaxial to form a substantially continuous bore adapted to slidably receive the hinge pin 9. A vertical-lift hinge 3 is defined herein as the second leaf 20 coupled with the third leaf 30 with the hinge pin 9. The vertical-lift hinge 3 is adapted to rotate about a substantially horizontal axis and open to a predetermined lift angle β, as shown in FIG. 2B.

It is contemplated that a wide variety of embodiments may be used to accomplish the functionality of the multi-axis automobile door mount 1, only one of which having a swing hinge 2 and the vertical-lift hinge 3. The wide variety of pivoting mechanisms used in the art for conventional single-axis hinges may be incorporated into the multi-axis automobile door mount 1. For example, but not limited thereto, it is appreciated that the multi-axis automobile door mount 1 will operate in substantially the same manner where the arrangement of the knuckles and notches are transposed on respective leaves. For example, the first lift knuckles 24 and the lift notch 26 of the second leaf 20 is replaced with a single lift knuckle, and the second lift knuckle 34 on the third leaf 30 is replaced with two knuckles and a notch. Also, it is appreciated that the number of knuckles and notches may vary without deviating from the basic operation and function of the multi-axis automobile door mount 1.

It is appreciated that the shape of the knuckles and notches may be varied while retaining the functionality provided by the multi-axis automobile door mount 1. For example, but not limited thereto, the knuckle is in the form of one or more extending flanges each having an aperture substantially coaxial with the other, each flange aperture being coaxial with and placed in sliding pivoting engagement with a corresponding flange aperture of a corresponding leaf.

Referring again to FIGS. 3A and 3B, the multi-axis automobile door mount 1 is used to couple the door 53 to the automobile body 51, in accordance with an embodiment of the present invention. The first leaf 10 is coupled to the hinge mount body surface 52 of a doorjamb 152 with the swing hinge 2 orientated away from the automobile body 51 to function as a stationary leaf. The third leaf 30 is coupled to the hinge mount door surface 54 of the door edge 154 with the vertical-lift hinge 3 in an upward orientation to function as a hinge leaf. The second leaf 20 is coupled to the first leaf 10 and the second leaf 30 to allow for swing-out and vertical-lift movement, respectively, as previously described.

It is understood that the specific location of the knuckles on their respective leaves will determine, among other things, the pivoting characteristics of the respective hinge. In the embodiment of the first leaf 10 as shown in FIGS. 4A and 4B, and as previously stated, the two spaced apart first swing knuckles 17 extend from the first leaf second side 114 adjacent the first leaf second edge 116. In another embodiment of the first leaf 10, in accordance with the present invention, the two spaced apart first swing knuckles 17 extend from the first leaf second side 114 a predetermined distance from the first leaf second edge 116. Correspondingly, the complementary second swing knuckle 27 of the second leaf 20 extends from the second leaf first side 123 a predetermined distance from the second leaf second edge 126. The axis of rotation, therefore, is positioned closer to the coupling portion 18 and therefore effects the way that the door 53 will swing out from the doorjamb 152. Therefore, the location of the knuckles, and therefore the axis of rotation, is determined to be that which is suitable for a particular purpose.

Referring again to FIG. 5A, the second swing knuckle 27 of the second leaf 20 extends from the second leaf first side 123 a predetermined distance from the second leaf second edge 126. The second leaf 20 further comprises a raised portion 28 of the second leaf first side 123 adjacent to the second swing knuckle 27 and the second leaf second edge 126. As shown in FIG. 2A, the maximum swing-out angle α will be determined by the abutment of the raised portion 28 against the first leaf 10. Therefore, the distance in which the raised portion 28 extends from the second leaf first side 123 determines the maximum swing-out angle α; a greater extension will reduce the maximum swing-out angle α. The distance in which the raised portion 28 extends from the second leaf first side 123 is determined to be that which is suitable for a particular purpose.

In other embodiments in accordance with the present invention, a maximum swing-out angle α adjustment means is provided. In one embodiment of a maximum swing-out angle α adjustment means comprises a set screw 128 provided in addition to or in lieu of the raised portion 28, as shown in FIG. 5A. The set screw 128 extends from the second leaf first side 123 adjacent to the second swing knuckle 27 and the second leaf second edge 126. The set screw 128 is adapted to be raised or lowered to provide a desired predetermined distance in which the set screw 128 extends from the second leaf first side 123 and therefore the maximum swing-out angle α in which the set screw 128 will come into abutment with the first leaf 10.

An important consideration, among others, in the retrofitting of conventional single-axis swing-out doors to operate with a vertical-lift operation is the assurance that the door 53 will not collide with the automobile body 51 when vertically lifted. In other embodiments of the multi-axis automobile door mount 1 in accordance with the present invention, a lift hinge locking means is provided to restrict the vertical motion of the vertical-lift hinge 3 until the swing-out hinge 2 has opened to a predetermined angle α, as shown in FIG. 2A.

FIGS. 1B, 1C, 2A, 2B, 3A, 4A and 4B illustrate a lift hinge locking means in the form of a lift hinge locking pin 19 and first and second lift hinge locking slots 21, 31, in accordance with an embodiment of the present invention.

The first leaf 10 further comprises a lift hinge locking pin 19 and second and third leaves 20, 30 further comprise first and second lift hinge locking slots 21, 31, respectively, that, in cooperative engagement with the lift hinge locking pin 19, restrict the function of the vertical-lift features of the multi-axis automobile door mount 1. The lift hinge locking pin 19 is an elongated member, such as, but not limited to a generally cylindrical member, that extends a predetermined distance from the first leaf second side 114. The lift hinge locking pin 19 is adapted to be accepted by the first and second lift hinge locking slots 21, 31 of the second and third leaves 20, 30, respectively, as shown in FIG. 1B, and as discussed below.

The second leaf 20 further comprises a first lift hinge locking slot 21 and the third leaf 30 further comprises a second lift hinge locking slot 31. The first lift hinge locking slot 21 and the second lift hinge locking slot 31 extend a predetermined distance from the second leaf first edge 125 and the third leaf first edge 135, respectively, as shown in FIGS. 5B and 6B, respectively, and are substantially collocated to engage the lift hinge locking pin 19 therein.

The multi-axis automobile door mount 1, as positioned in a closed position, as shown in FIG. 1B, provides the lift hinge locking pin 19 to extend from the first leaf second side 114, through the first lift hinge locking slot 21 and further through the second lift hinge locking slot 31 in cooperative engagement. The lift hinge locking pin 19 moves out of engagement with the first and second lift hinge locking slots 21, 31 as the swing hinge 2 is pivoted to an open position to a predetermined angle $\alpha$.

The vertical-lift hinge 3 is prevented from pivoting when the lift hinge locking pin 19 is engaged with the first and second lift hinge locking slots 21, 31. This feature provides that the vertical-lift hinge 3 is restricted from movement until the swing hinge 2 is positioned at a predetermined angle $\alpha$ x wherein the lift hinge locking pin 19 disengages the first and second lift hinge locking slots 21, 31. As will be explained in detail below, this feature prevents the door 53 from rotating vertically until it is swung out to a predetermined angle $\alpha$ where the door 53 will clear the automobile body 51 when the door 51 is vertically lifted.

In operation, the door 53 is opened initially from a closed position in the conventional swing-out rotation. At a predetermined swing-out angle $\alpha$, or greater, of the door 53 to the automobile body 51, as shown in FIG. 3A, the lift hinge locking pin 19 rotates clear of the first and second lift hinge locking slots 21, 31, permitting a vertical rotation of the door 53 in an upward direction about the vertical-lift hinge 3, to a predetermined angle $\beta$. The door 53 is initially closed by vertically rotating the door 53 down from a lifted position. The lift hinge locking pin 19 is adapted to prevent the downward rotation of the door 53 unless the door 53 is at, or greater than, the predetermined swing-out angle $\alpha$. The door 53 is lowered to a substantially horizontal position where the lift hinge locking pin 19 is aligned to engage the first and second lift hinge locking slots 21, 31 as the vertical-lift hinge 3 is fully closed. The door 53 is subsequently closed in the conventional swing-in manner, with the lift hinge locking pin 19 coming into engagement with the first and second lift hinge locking slots 21, 31.

The length of the lift hinge locking pin 19 extending from the first leaf second side 114 determines, among other things, the minimum swing-out angle $\alpha$ where the lift hinge locking pin 19 disengages with the first and second lift hinge locking slots 21, 31. A longer lift hinge locking pin 19 will engage the first and second lift hinge locking slots 21, 31 over a greater swing-out angle $\alpha$ than would be provided by a shorter lift hinge locking pin 19.

The multi-axis automobile door mount 1 provides an initial swing-out prior to enabling vertical-lift of the door 53 providing a number of advantages. These advantages include, but are not limited to, retaining the conventional swing-out operating characteristics associated with the initial opening and final closing movement of the door, and enabling the ability to accommodate many door shapes for vertical-lift operation. Retaining the initial swing-out of the door provides that no modification to the stock latching and closing mechanism is required. Further, the integrity of the stock door sealing and weather stripping system is not compromised.

The initial swing-out of the door 53 also provides that all door structures will clear the automobile body 51 as the door 53 is vertically-lifted. This permits the incorporation of vertical door operation for automobiles with doors that have structures that would collide with the automobile body 51 if the door 53 were to be opened using a single-axis vertical-lift hinge. Such door structures include, but are not limited to, an undercut bottom door edge that wraps inwardly under the automobile body 51 that would collide with the doorjamb 152.

Another important consideration, among others, in the retrofitting of conventional swing-out doors with swing-out vertical-lift operation is to provide the ability to adjust or fine tune the operation and alignment of the multi-axis automobile door mount 1. Adjustment and alignment considerations can take many forms, including, but not limited to: strategic placement of the multi-axis automobile door mount 1 for proper alt-azimuth location of the vertical and horizontal pivot axis location; means for accommodating misaligned bolt holes; means for adjusting minimum swing-out opening angle $\alpha$ until disengagement of the vertical pivot locking pin with the lift hinge locking slots; means for adjusting maximum swing-out opening angle $\alpha$, and means for adjusting door alignment with the doorjamb.

Referring again to FIGS. 3A and 3B, the door vertical pivot point is determined, in part, by the vertical distance of the multi-axis automobile door mount 1 within the doorjamb 152. The higher the multi-axis automobile door mount 1 is mounted within the doorjamb 152, the higher the resulting vertical and horizontal pivot axis location. A higher pivot axis location may be required wherein a portion of the door 53 above the multi-axis automobile door mount 1 would otherwise collide with the automobile body 51 when in vertical-lift position, such as, but not limited to, upper door corner 57.

In one embodiment in accordance with the present invention, means for accommodating misaligned bolt holes between the bolt holes of the first leaf 10 and the hinge mount body surface 52, and the bolt holes 37 of the third leaf 30 and the hinge mount door surface 54, is provided. As discussed previously, in one embodiment in accordance with the present invention, the bolt holes 37 in the first leaf 10 and/or the third leaf 30 are elongated to facilitate alignment with misaligned bolt holes 37 in the hinge mount body surface 52 and/or hinge mount door surface 54, respectively, as shown in FIG. 6A. In another embodiment in accordance with the present invention, the elongated bolt holes 37 further provide the ability to adjust and align the angular position of the multi-axis automobile door mount 1 with respect to global horizontal and vertical axes.

In one embodiment in accordance with the present invention, means for adjusting the minimum swing-out angle $\alpha$ at which point the vertical-lift hinge 3 is free to rotate, as shown in FIG. 2A is provided. One embodiment in accordance with the present invention of a means for adjusting the minimum swing-out angle α, means for providing a length-adjustable lift hinge locking means is provided.

Figure 4D:
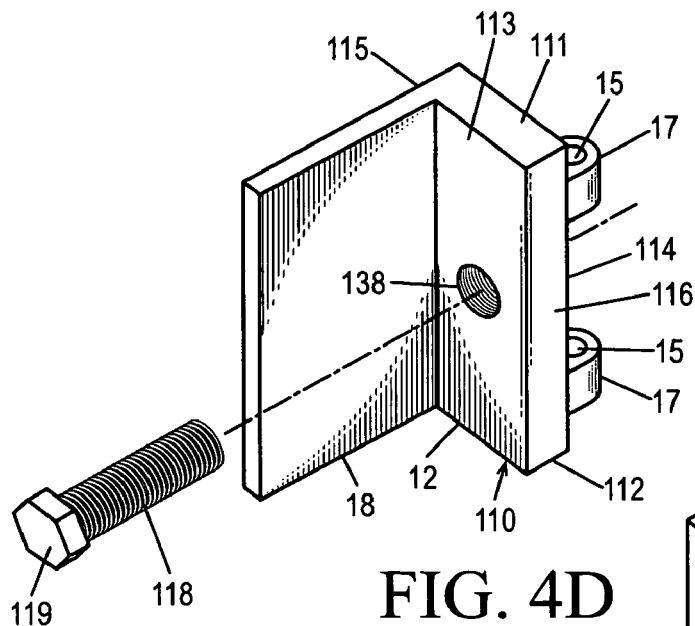
FIGS. 4D and 4E are front and rear perspective views of an embodiment of a first leaf with an adjustable lift hinge locking means in the form of a lift hinge locking bolt, in accordance with the present invention.
Figure 4E:
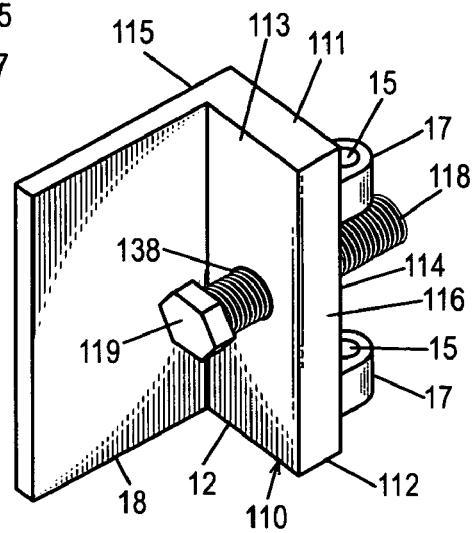

FIGS. 4D and 4E are front and rear perspective views of an embodiment of a first leaf 110 with an adjustable lift hinge locking means in the form of a lift hinge locking bolt 119, in accordance with the present invention. The first leaf 110 is substantially similar to the first leaf 10 as shown in FIGS. 4A and 4B. The first leaf 110 further comprises a threaded through hole 138 extending from the first leaf first side 113 through to the first leaf second side 114. The first leaf 110 further comprises the lift hinge locking bolt 119 adapted to threadably engage the threaded through hole 138. The lift hinge locking bolt 119 comprises a shaft 118 having a diameter adapted to move into cooperative engagement with the first and second lift hinge locking slots 21, 31.

The engagement of the lift hinge locking bolt 119 and the threaded through hole 138 permits the user to adjust the extent from which the lift hinge locking bolt 119 projects from the first hinge second surface 114. The length of the lift hinge locking bolt 119 that extends from the first hinge second surface 114 determines, in part, to what minimum swing-out angle α that the lift hinge locking bolt 119 disengages with the first and second lift hinge locking slots 21, 31. A longer extension of the lift hinge locking bolt 119 engages the first and second lift hinge locking slots 21, 31 over a greater swing-out angle α than would be provided by a shorter extension of the lift hinge locking bolt 119.

In one embodiment in accordance with the present invention, means for adjusting the alignment of the door 53 with respect to the doorjamb 152 is provided by a means for setting the degree of angular rotation of the door 53 with respect to the doorjamb 152. FIG. 5B illustrates an embodiment of a means for adjusting the alignment of the door 53 comprising a vertical set screw 58 in accordance with the present invention. The vertical set screw 58 threadably extends from the second leaf second side 124 a distance that is adjustable by the turning of the set screw 58 within a threaded bore 258. The vertical set screw 58 abuts the third leaf first side 135 when the vertical lift hinge 3 is in the closed or down position. In another embodiment in accordance with the present invention, as shown in FIG. 6A, a vertical set screw 158 threadably extends from a threaded bore 358 extending into the third leaf first side 133 to abut the second leaf second side 124 in similar function as provided above.

The vertical set screw 58, 158 is provided to adjust the angular position of the lift hinge 3 when in the closed or down position. The angular position of the lift hinge 3 in the closed position will determine, in part, the alignment of the door 53 with respect to the doorjamb 152. Extension of the vertical set screw 58, 158 is adapted to provide adjustment of the position of a distal door edge 59 in an upward direction with respect to the doorjamb 152, as shown in FIG. 3B.

In accordance with other aspects of the present invention, embodiments of multi-axis automobile door mount systems are provided that are adapted to facilitate pivotal motion of an automobile door about a substantially vertical axis of rotation for swing-out rotation as well as to facilitate pivotal motion of an automobile door about a substantially horizontal axis of rotation for vertical-lift rotation are provided, in addition to providing assistance with the operation of the automobile door.

Embodiments of a vertical-lift door system provides the assembler or consumer an integrated system of one or more hinges and lift assist devices to provide the operating characteristics of a swing-out vertical-lift door. The lift assist devices provide for, singularly or in combination, among other things, controlled and deliberate movement of the door, power-assisted door operation, and easier integration and assembly onto automobiles during assembly as well as stock automobiles for retrofit applications.

Figure 7A:
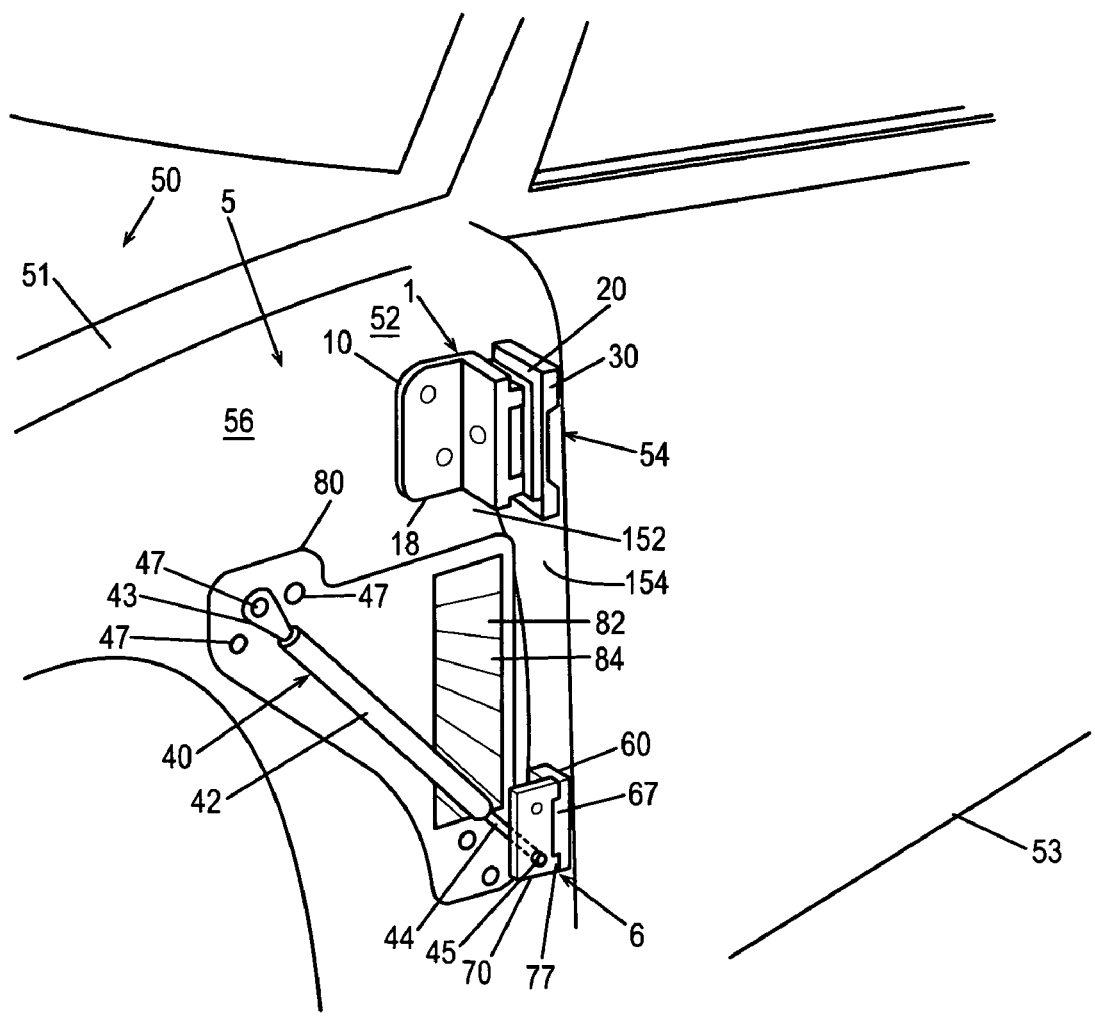
FIGS. 7A and 7B are perspective and side views, respectively, of a vertical-lift door system, in accordance with the present invention.
Figure 7B:
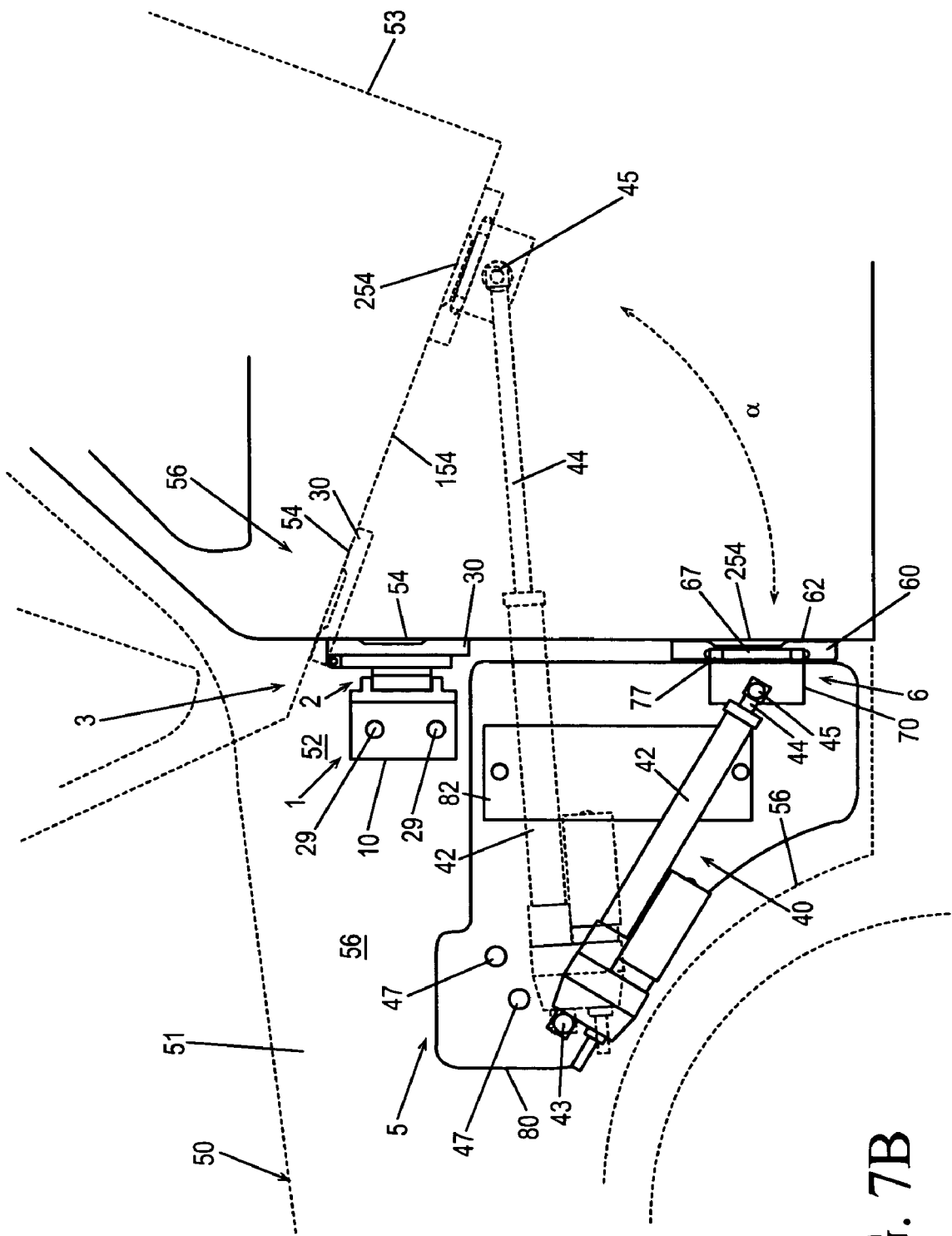

FIGS. 7A and 7B are perspective and side views, respectively, of a multi-axis automobile door mount system 5, in accordance with the present invention. FIG. 7A is a view from the front left corner of the automobile 50, whereby the left side is shown with the door 53 in a closed position. FIG. 7B is a view from the left side of the automobile 50, whereby the door 53 is shown in phantom in an open position.

Figure 8:
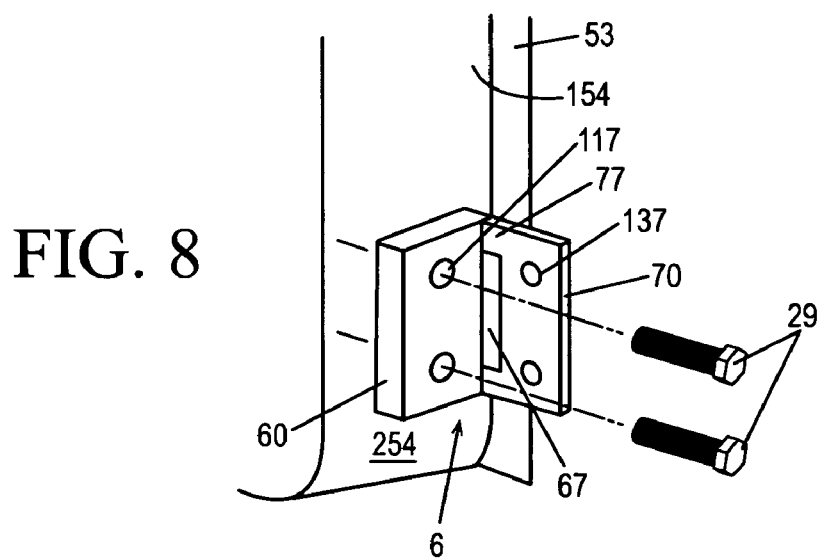
FIG. 8 is a perspective view of an embodiment of a swing hinge in accordance with the present invention.

The multi-axis automobile door mount system 5 comprises the multi-axis automobile door mount 1 as provided in embodiments above, a swing hinge 6, and a linear actuator means 40. The multi-axis automobile door mount 1 is coupled to the hinge mount body surface 52 of the doorjamb 152 and the hinge mount door surface 54 of the door edge 154 as described in embodiments above. The swing hinge 6 is coupled to a swing hinge mount door surface 254 below the multi-axis automobile door mount 1 as shown in FIG. 8. The linear actuator means 40 is coupled at one end to the automobile body 51, such as, but not limited to, an inner fender surface 56, and at another end to the swing hinge 6.

FIG. 8 is a perspective view of an embodiment of a swing hinge 6 in accordance with the present invention. The swing hinge 6 is adapted to provide substantially horizontal rotation about a vertical axis of rotation to permit the door 53 to operate in a conventional swing-out manner. The swing hinge 2 of the multi-axis automobile door mount 1 and the swing hinge 6 are complementary in operation for providing the swing-out rotation of the door 53. The swing hinge 6 comprises a pivotally joined first swing leaf 60 and second swing leaf 70. The first swing leaf 60 is coupled to a swing hinge mount door surface 254, such as the door edge 154 with a suitable coupling means, such as, but not limited to, welding, brazing, and mechanical fastening, such as with bolts 29. The second swing leaf 70 is coupled as described below.

The linear actuator means 40 is adapted to provide assistance with the operation of the door 53. The assistance provided by the linear actuator means 40 is in the form of, for example, but not limited to, structural support, lift assist, closing resistance, door positioning, and door control. Apparatus that provides the function of the linear actuator means 40 includes, but is not limited to, a gas strut, a pneumatic piston, a hydraulic piston, an electrically-driven linear actuator, a spring-loaded telescoping hinge, and an electromagnetic linear actuator.

As shown in FIG. 7B, the linear actuator means 40 comprises a first actuator section 42 and a second actuator section 44, in accordance with an embodiment of the linear actuator means 40 of the present invention. The second actuator section 44 is adapted to linearly translate from within the first actuator section 42. Distal from the second actuator section 44, the first actuator section 42 comprises a first actuator end 43. Distal from the first actuator section 42, the second actuator section 44 comprises a second actuator end 45. The first actuator end 43 is coupled to the body 51 of the automobile 50 at a location on a side of the swing hinge 6 that is opposite the door 53, such as, but not limited to, an inner fender surface 56. The second actuator end 45 is coupled to the second swing leaf 70.

The first and second linear actuator ends 43, 45 are coupled using a coupling means that provides for pivoting in the vertical direction and accounts for misalignment in the lateral direction. Coupling means that provide the necessary pivoting movement are well known in the art and include, but are not limited to, ball stud mounts and universal joints.

The coupling location of the first linear actuator end 43 to the inner fender 56 is determined by the operation characteristics of the particular linear actuator means 40 and the degree of leverage required for a particular purpose. In the embodiment shown in FIGS. 8A and 8B, the linear actuator first end 43 is coupled to the inner fender 56 forward and substantially equidistant from the multi-axis automobile door mount 1 and the swing hinge 6. The specific location on the inner fender 56 used to couple with the linear actuator first end 43 will depend on parameters of the specific door 53, such as, but not limited to, size and weight, and the desired operating characteristics.

The linear actuator means 40 is adapted to provide assistance with the operation of the door 53 for a particular purpose. In an embodiment in accordance with the present invention, the linear actuator means 40 is a spring-loaded telescoping hinge 140, as shown in FIG. 7A, that is biased in the extended position of the second actuator section 44 with respect to the first actuator section 42. In this example, the linear actuator means 40 provides a vertical-lift bias to the door 53, assisting in the lifting of the door 53 and preventing the door 53 from dropping from the lifted position. The bias is overcome when the door 53 is forcefully brought down from the lifted position and swung closed.

In another embodiment in accordance with the present invention, the linear actuator means 40 is a gas-filled strut that resists movement from a stationary position, such that the strut is biased to remain in the extended position-when the door 53 is positioned in the fully vertically lifted position, and remain in the contracted position when the door 53 is in the fully lowered position.

In another embodiment in accordance with the present invention, the linear actuator means 40 is frictionally biased to provide resistance to movement to support the door 53 such that the door 53 remains stationary when released in any vertical position throughout its range of motion.

In yet another embodiment in accordance with the present invention as show in FIG. 7B, the linear actuator means 40 is an electrically-driven linear actuator 240 that is adapted to be activated to vertically lift the door 53 when swung open and activated to vertically lower the door 53 when the door 53 is commanded to be closed.

In another embodiment of a vertical-lift door system (not shown) in accordance with the present invention, a second swing hinge 6 and a second linear actuator means 40 is provided. Two linear actuator means 40 provide, among other things, the benefit of structural support and stability afforded by three-point door attachment. A two linear actuator means vertical-lift door system provides more parameters for, such as, but not limited to, adjusting the opening characteristics of the door 53 to suit a particular purpose.

In another embodiment of a vertical-lift door system in accordance with the present invention, the vertical-lift door system 5 provided above further comprises a bracket 80, as shown in FIGS. 7A and 7B. The bracket 80 is adapted to provide, among other things, reinforcement to the inner fender 56 to accommodate the coupling of the first actuator end 43. The bracket 80 is coupled to the inner fender 56 using any suitable means, such as, but not limited to, welding, brazing and mechanical fastening. The first actuator end 43 is coupled to the bracket 80.

In an embodiment in accordance with the present invention, the bracket 80 is provided with a suitable bolt hole 47 in a predetermined location by the assembler or consumer. The suitable bolt hole 47 is provided for the coupling of the first actuator end 43 to the bracket 80. The location of the bolt hole 47 is determined to provide desired vertical operating characteristics of the door 53 as discussed above.

In another embodiment in accordance with the present invention, the bracket 80 is provided with a plurality of bolt holes 47 in predetermined locations to assist in the coupling of the first actuator end 43 to the bracket 80. The plurality of bolt holes 47 are adapted to provide the assembler or consumer a suitable selection of mounting positions of the actuator first end 43 to provide desired vertical operating characteristics of the door 53.

In other embodiments of a vertical-lift door system in accordance with the present invention, the vertical-lift door system 5 provided above further comprises a passive vertical control means for-controlling the vertical-lift operation of the door 53. In one embodiment in accordance with the present invention, the passive vertical control means 82 is a rub plate 83, as shown in FIGS. 7A and 7B. The rub plate 83 is coupled to the bracket 80 positioned between the bracket 80 and the linear actuator means 40. The thickness of the rub plate 83 is adapted to engage the linear actuator means 40 throughout at least a portion of the pivotal range of motion of the linear actuator means 40 about the actuator first end 43.

In one embodiment in accordance with the present invention, the engagement between the rub plate 83 and the linear actuator means 40 is frictional engagement. The vertical movement of the door 53 is controlled by the specific degree of frictional engagement between the rub plate 83 and the linear actuator means 40. In one embodiment, the friction provides sufficient resistance against the linear actuator 40 so as to hold the door 53 in a desired vertical-lift position. In another embodiment, the rub plate 83 provides little or no resistance against the linear actuator 40 so as to simply guide the linear actuator 40, and thus the vertical motion of the door 53, within a plane that is coplanar with the surface of the rub plate 83.

In another embodiment in accordance with the present invention, the rub plate 83 comprises a series of grooves 84 adapted to accept at least a portion of the linear actuator means 40 therein, as shown in FIG. 7A. The grooves 84 engage and hold the linear actuator means 40, providing predetermined locations along the range of pivotal motion of the linear actuator means 40 wherein the door 53 is held at a desired vertical position.

In another embodiment in accordance with the present invention, one of the grooves 83 is adapted to provide a stop for the linear actuator means 40 that demarcates a lower position to provide proper vertical alignment with the doorjamb 152 when the door 53 is in the lowered or closed position. In one embodiment, the groove 83 is adjusted in location to provide a desired stand-off distance of the door 53 with the automobile body 51, such that the surface of the door 53 is positioned flush with an adjacent surface of the automobile body 51.

In one embodiment in accordance with the present invention, the rub plate 83 comprises a material that permits the assembler or consumer to sculpt or form the surface of the rub plate 83 to suit a particular purpose. In an embodiment in accordance with the present invention, the surface of the rub plate 83 is adapted to be sculpted to provide custom alignment for the door 53 as discussed above, as well as custom vertical positioning of the door 53. Suitable materials include, but are not limited to, urethane and nylon.

Embodiments of the multi-axis automobile door mount 1 and the vertical-lift door system 5 in accordance with the present invention provide the operation of the door 53 to initially swing-out to a predetermined angle α and rotate vertically upwards a predetermined angle β. The initial swing-out of the door 53 provides a number of advantages, including, but not limited to, retention of the initial opening and final closing operating characteristics of the conventional swing-out door enabling retention of the original door latching mechanism and the door sealing and weather stripping. The initial swing-out operation provides that all door structures will clear the automobile body 51 as the door 53 is vertically lifted. This permits the incorporation of vertical-lift door operation for automobiles 50 with doors 53 that have structures that would otherwise collide with the automobile body 51 if the door 53 was opened in a purely vertical operation.

Embodiments of the multi-axis automobile door mount 1 and the vertical-lift door system 5 in accordance with the present invention provide the ability to make available vertical-lift door operation not only to automobile manufacturers, but also to the automobile enthusiast who desires to convert an automobile from swing-out door operation to vertical-lift operation with a minimum amount of modification to the automobile.

Figure 9A:
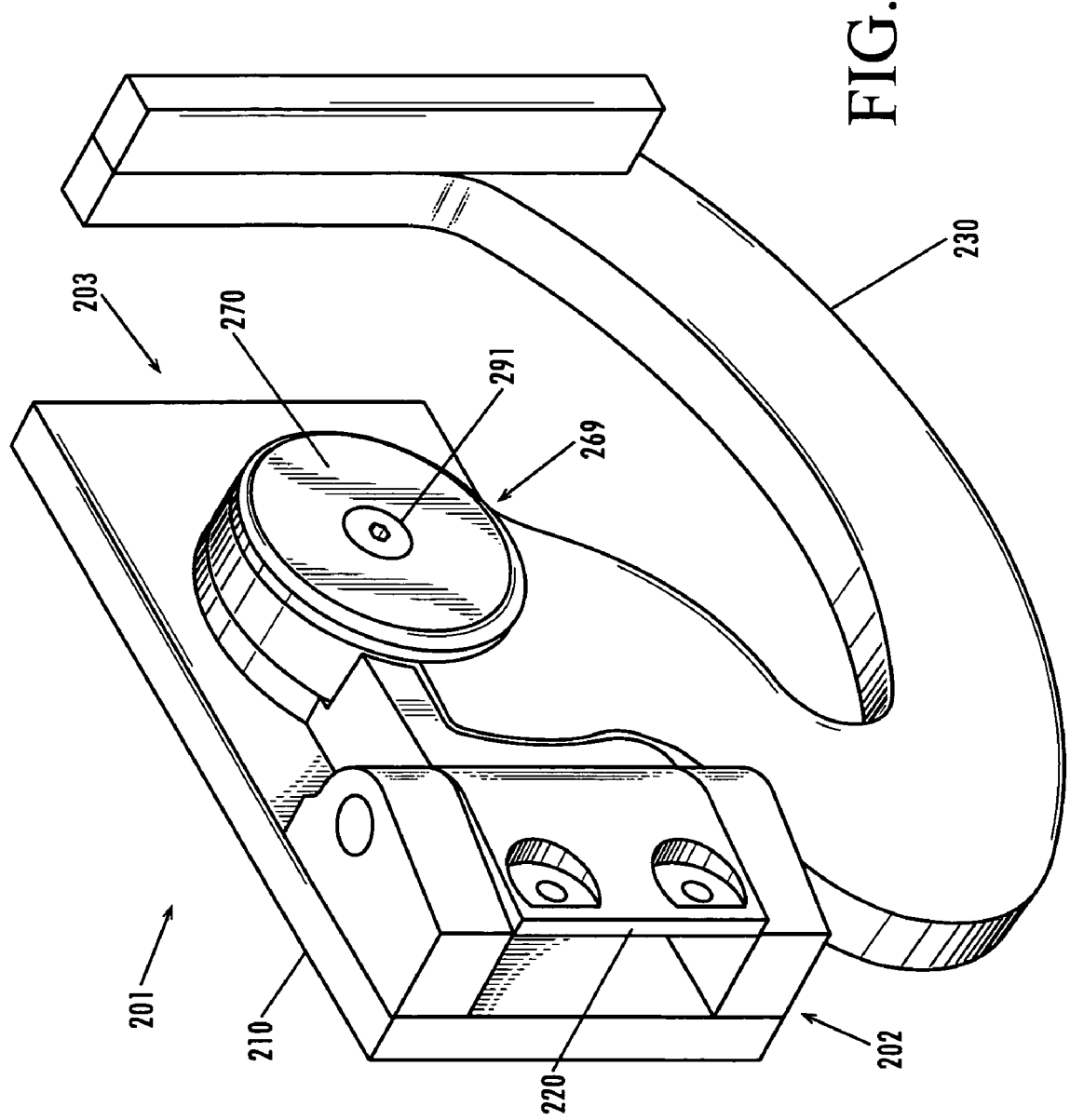
FIGS. 9A–9C are side perspective views of a multi-axis automobile door hinge in a closed and open position, and exploded view, respectively, in accordance with an embodiment of the present invention.
Figure 9B:
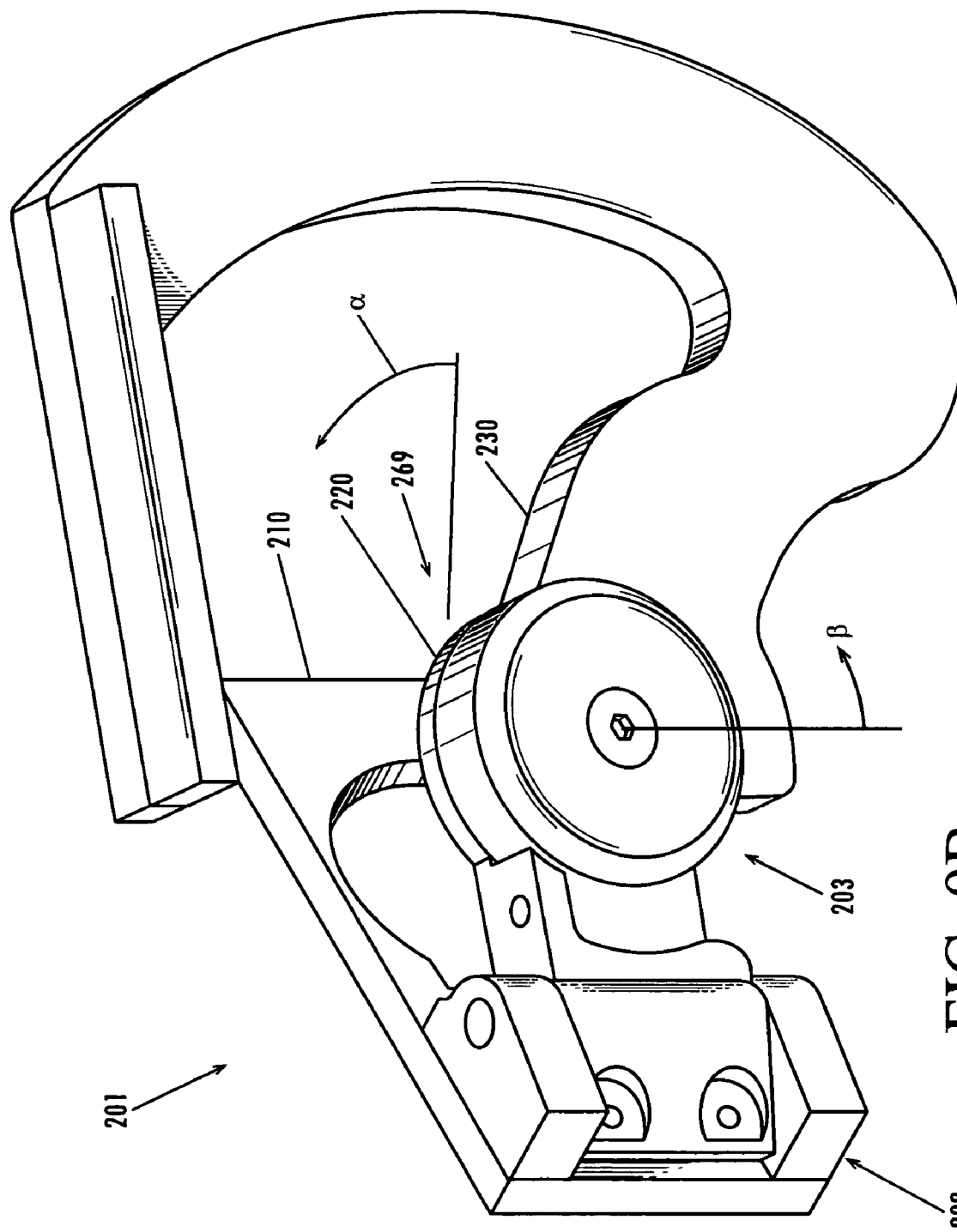
Figure 9C:
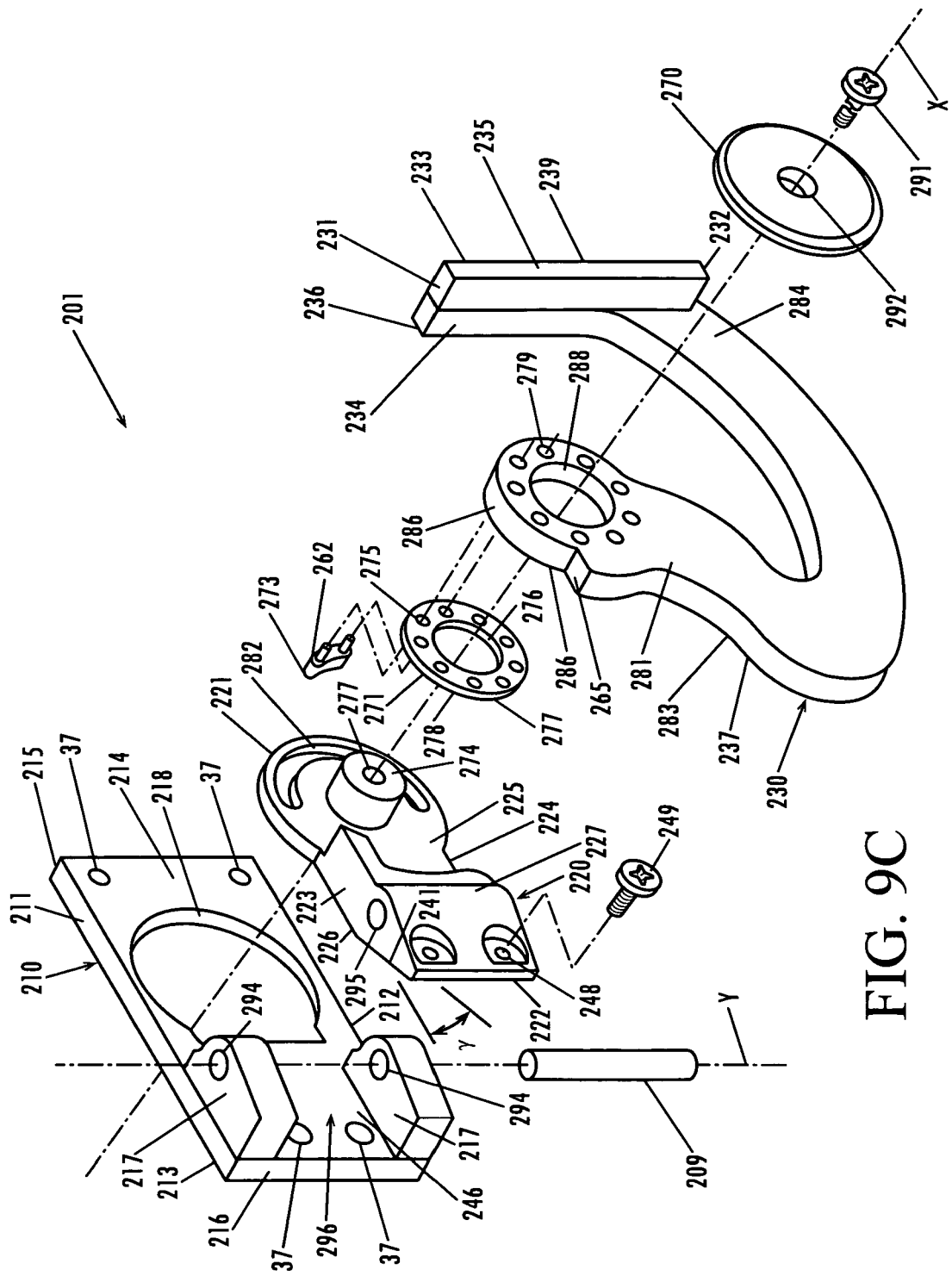

FIGS. 9A–9C are side perspective views of a multi-axis automobile door hinge 201 in a closed and open position, and exploded view, respectively, in accordance with an embodiment of the present invention. The multi-axis automobile door hinge 201 comprises a first leaf 210, a second leaf 220, and a third leaf 230. The first leaf 210 and the second leaf 220 are coupled with a hinge pin 209 defining a swing-out hinge 202 that provides rotation in a substantially horizontal plane about a substantially vertical axis of rotation Y. The second leaf 220 and the third leaf 230 are coupled about a lift bearing 269 defining a vertical-lift hinge 203 that provides rotation in a substantially vertical plane about a substantially horizontal axis X of rotation. The multi-axis automobile door hinge 201, therefore, provides rotation in a substantially horizontal plane, noted as swing angle .alpha., and rotation in a substantially vertical plane, noted as lift angle .beta., separately, and in combination, to suit a particular purpose.

Figure 10:
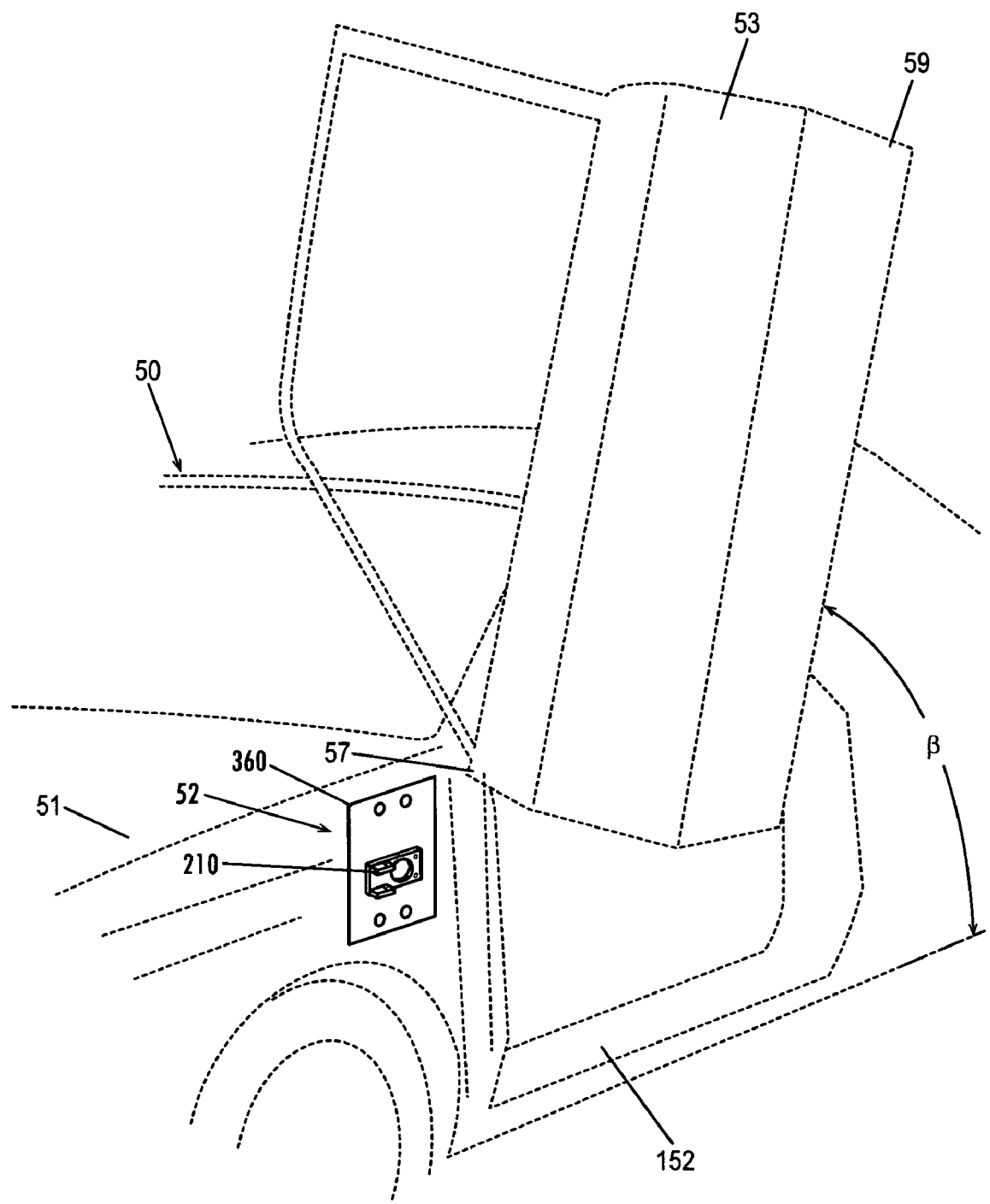
FIG. 10 is a side perspective view of a first leaf of a multi-axis automobile door hinge coupled to an automobile, in accordance with an embodiment of the present invention.

The multi-axis automobile door hinge 201 is adapted to provide a door 53 of an automobile 50 with swing-out and vertical-lift operational characteristics, in accordance with an embodiment of the present invention, substantially as shown in FIGS. 3A, 3B and 10.

The first leaf 210 is adapted to be coupled to a hinge mount body surface 52 of a doorjamb 152 in substantially the same way as the first leaf 10 shown in FIGS. 3A–3B. The first leaf 210, therefore, is adapted to function as a stationary leaf. The third leaf 230 is adapted to be coupled to a hinge mount door surface 54 of a door edge 154 in substantially the same way as the third leaf 30 shown in FIGS. 3A–3B, to function as a hinge leaf. The second leaf 220 is pivotally coupled about a vertical axis of rotation to the first leaf 210, and pivotally coupled about a horizontal axis of rotation to the third leaf 230 which provides rotation of the door 53 within a substantially horizontal and substantially vertical plane, respectively.

In yet another embodiment in accordance with the present invention, the hinge mount body surface 52 is that surface vacated by the removal of a stock swing hinge stationary leaf, and the hinge mount door surface 54 is that surface vacated by the removal of the stock swing hinge leaf. This embodiment provides a one-for-one replacement of the single-axis stock hinge with the multi-axis automobile door hinge 201.

The multi-axis automobile door hinge 201, as will be discussed below, provides a combination of swing-out and vertical-lift motion for, among other things, the retrofitting of a conventional single-axis swing-out automobile door for swing-out and vertical-lift operation. In one embodiment in accordance with the present invention, the door 53 is adapted to open from a closed position in the conventional swing-out rotation about the swing-out hinge 202 within a substantially horizontal plane. At a predetermined angle .alpha. of the door 53 to the automobile body 51, the door 53 is adapted to rotate upward about the vertical-lift hinge 203 within a substantially vertical plane to a predetermined lift angle .beta.. The door 53 is adapted to close by lowering the door 53 to the substantially horizontal orientation and swung-in in the conventional manner.

Referring again to FIGS. 9A–9C, each leaf is discussed in turn below. The first leaf 210 comprises a first leaf first edge 211, a first leaf second edge 212, a first leaf first side 213, a first leaf second side 214, a first leaf third edge 215, and a first leaf fourth edge 216. Extending from the first leaf second side 214 adjacent the first leaf fourth edge 216 are two spaced apart first swing knuckles 217 defining a swing notch 296 there-between. The first swing knuckles 217 each define a first swing knuckle bore 294 there-through. The axis of the first swing knuckle bores 294 are in substantially coaxial alignment and extend substantially along the vertical axis Y when the first leaf 210 is coupled to an automobile for a particular purpose. The swing notch 296 is adapted to accept a second swing knuckle 227 of the second leaf 220, as will be discussed below.

The first leaf 210 further comprises a recessed portion 218, extending a predetermined distance into the first leaf second side 214. The recessed portion 218 is adapted to receive a portion of the second leaf 220, as will be described below. In another embodiment in accordance with the present invention, the recessed portion 218 is a through hole extending from the first leaf second side 214 to the first leaf first side 213. In yet another embodiment in accordance with the present invention, the first leaf 210 has no recessed portion as defined above.

In an application of the multi-axis automobile door hinge 201, in accordance with the present invention, the first leaf 210 is the stationary leaf coupled to a hinge mount body surface 52 of a doorjamb 152 of an automobile 50 as similarly shown in FIGS. 3A and 3B. The hinge mount body surface 52 may take many forms that are particular to specific models of automobile 50, and therefore, the first leaf 210 is adapted to facilitate coupling to a specific hinge mount body surface 52 particular to the automobile 50.

In an embodiment in accordance with the present invention, the first leaf first side 213 is adapted to couple with, such as but not limited to, the hinge mount body surface 52 of the doorjamb 152 of the automobile 50. The first leaf first side 213 is coupled to the hinge mount body surface 52 using any number of appropriate coupling means known in the art, including, but not limited to, welding, brazing, and mechanical fastening.

The first leaf 210 is adapted to facilitate the provision of a plurality of bolt holes 37 extending from the first leaf first side 213 to the first leaf second side 214, such as, but not limited to, those made by the consumer or assembler using a drill, in predetermined locations that correspond to a bolt pattern provided in the hinge mount body surface 52 of the doorjamb 152 of a specific automobile 50 after the removal of the conventional stock hinge. In another embodiment, the plurality of bolt holes 37 correspond to a new bolt hole pattern provided in the hinge mount body surface 52 of the doorjamb 152 made by the consumer or assembler. One or more bolts (not shown) couple the first leaf 210 to the automobile 50.

In another embodiment in accordance with the present invention, the first leaf 210 is provided with a plurality of bolt holes 37 in predetermined locations that correspond to a bolt pattern provided in a hinge mount body surface 52 of the doorjamb 152 of one or more specific model of automobile 50 after the removal of the conventional stock hinge, negating the need for the consumer or assembler to provide the bolt hole pattern in the multi-axis automobile door hinge 201.

In yet another embodiment in accordance with the present invention, the first leaf 210 is provided with a plurality of elongated bolt holes (not shown) in predetermined locations that correspond to one or more bolt patterns provided in the hinge mount body surface 52 of the doorjamb 152 of one or more specific models of automobile 50 after the removal of the conventional stock hinge. The elongated bolt holes allow for, among other things, accommodation of mal-aligned bolt hole patterns and applicability across a plurality of models of automobile.

The specific configuration of the first leaf 210 to permit coupling to an automobile surface is dependent on a specific automobile under consideration. Therefore, it is understood that other leaf configurations are anticipated that are adapted to couple to an automobile's particular body and/or door surface while retaining the mechanical function of a component of a multi-axis automobile door mount, as provided herein.

FIG. 10 is a side perspective view of a first leaf 210 of a multi-axis automobile door hinge coupled to an automobile 50, in accordance with an embodiment of the present invention. FIG. 10 is a view from the front left corner of the automobile 50 showing the door 53 in a swung-out vertically lifted open position. The first leaf 210 is coupled to a mounting plate 360 which is coupled to a hinge mount body surface 52 of a doorjamb 152. The mounting plate 360 provides multiple predefined locations upon which to couple with the hinge mount body surface 52, in accordance with one or more specific models of automobile. The mounting plate 360 provides multiple predefined locations upon which to couple the first leaf 210 thereto, in accordance with one or more specific models of automobile. In embodiments in accordance with the present invention, the mounting plate 360 is used to structurally reinforce the hinge mount body surface 52 suitable for withstanding the loads on the multi-axis automobile door hinge. In embodiments in accordance with the present invention, the mounting plate 360 comprises a plurality of bolt holes in predetermined locations that correspond to suitable locations for coupling the first leaf 210 thereto, for one or more specific models of automobile 50.

The second leaf 220 comprises a second leaf first end 221, a second leaf second end 222, a second leaf first edge 223, a second leaf second edge 224, a second leaf first side 225, and a second leaf second side 226. The second leaf second end 222 comprises a second swing knuckle bore 295 extending between the second leaf first edge 223 and the second leaf second edge 224 defining a second swing knuckle 227. The second swing knuckle 227 of the second leaf 220 is adapted to be interleaved within the swing notch 296 of the first leaf 210 with the axis of the first swing knuckle bores 294 and second swing knuckle bore 295 in substantially coaxial alignment, as discussed below.

A cylindrical lift hub 274 extends substantially perpendicular from the second leaf first side 225 adjacent the second leaf first end 221 and defining a horizontal axis X substantially transverse to the second swing knuckle bore 295 which is located along the vertical axis Y. The lift hub 274 defines a first half of a lift bearing 269. The second leaf first end 221 comprises a recessed portion defining a semi-circular raceway 282 that is coaxial with and spaced a predetermined distance from the lift hub 274. The lift hub 274 further comprises a threaded bore 277 to receive a fastener 291 therein, as explained further below.

The second leaf second end 222 comprises a bevel portion 241 defined therein. The bevel portion 241 faces the first leaf 210 and prevents rotation of the second leaf 220 greater than a predefined bevel angle .gamma., such as, but not limited to, 20.degree. (degrees), by the impact of the bevel portion 241 with a bevel impact surface 246 on the first leaf second side 214 adjacent the first leaf fourth edge 216. The second leaf second end 222 defines one or more threaded swing-limiting bores 248 extending through to the bevel portion 241. End portions of suitable fasteners 249, such as but not limited to bolts and set screws, adjustably extend beyond the bevel portion 241 to contact the bevel impact surface 246 when the second leaf 220 is at a predetermined swing angle .alpha. to provide adjustability of the extent of the swing angle .alpha. up to the maximum bevel angle .gamma.

In the embodiment of FIG. 9C, the second leaf first end 221 is adapted to be at least partially contained within the recessed portion 218 of the first leaf 210. The second leaf first end 221 defines a semi-circular shape having an axis substantially coaxial with the cylindrical lift hub 224. Other nesting shapes of the second leaf first end 221 and the recessed portion 218 are anticipated suitable for a particular purpose. The second leaf first end 221 being adapted to be at least partially contained within the recessed portion 218 of the first leaf 210 provides for an extended swing extension when in the closed position providing a hinge that can swing more closed than if not present. In another embodiment in accordance with the present invention, there is no recessed portion, thereby providing a reduced swing angle in the closed position suitable for a particular purpose.

Figure 11:
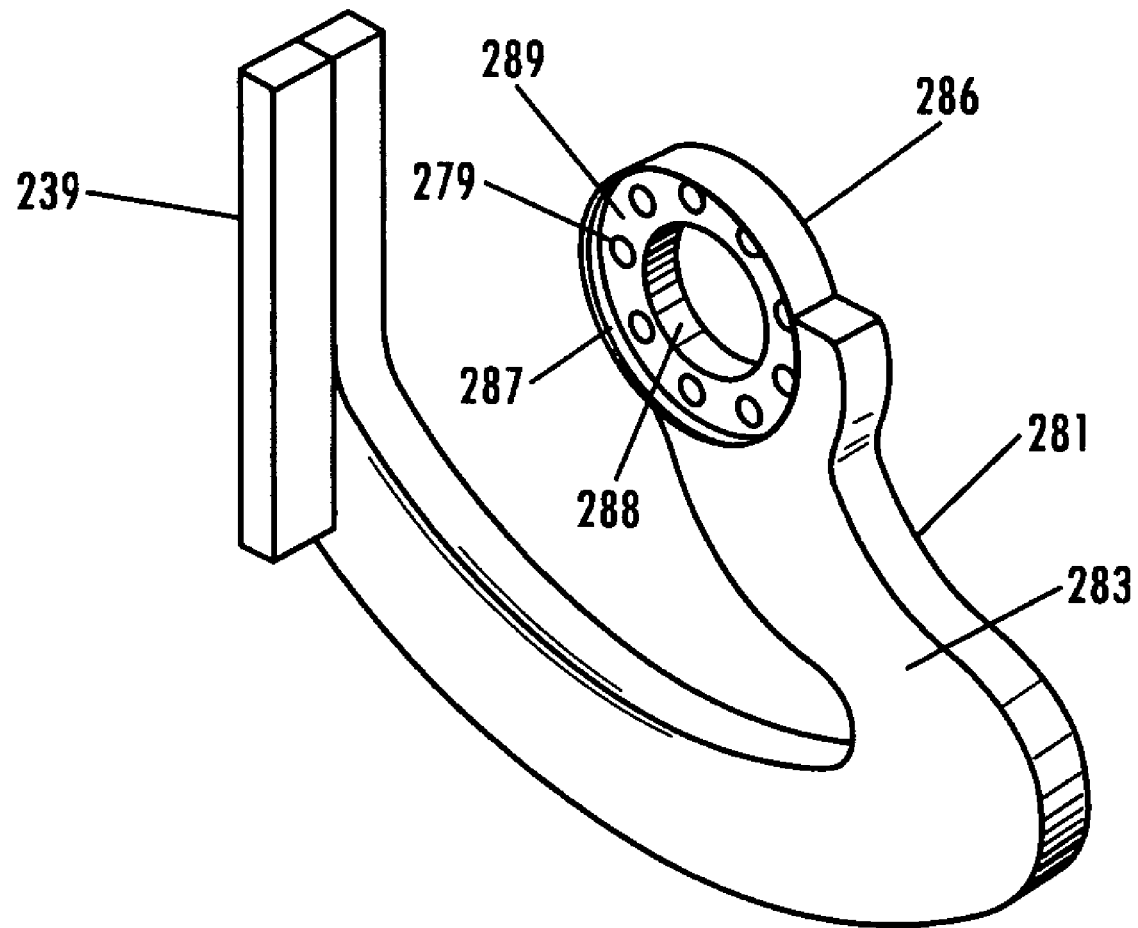
FIG. 11 is a rear perspective view of the third leaf, in accordance with an embodiment of the present invention.

FIG. 11 is a rear perspective view of the third leaf 230, in accordance with an embodiment of the present invention. Referring again to FIGS. 9A–9C, the third leaf 230 comprises a third leaf first end 231, a third leaf second end 232, a third leaf first side 233, a third leaf second side 234, a third leaf first edge 235, and a third leaf second edge 236 defining a mount plate 239. The third leaf 230 further comprises a lift arm 237, which has similar functionality as a highly modified version of the second lift knuckle 34 as shown in FIG. 6A, which extends from the third leaf second side 234 adjacent the third leaf second end 232. The lift arm 237 has a generally goose-neck shape having an arm first end 284 coupled with the third leaf second side 234 and terminating at an arm second end 286. The lift arm 237 comprises an arm first side 281 and an arm second side 283. The arm second end 286 comprises an arm bore 288 extending from the arm first side 281 to the arm second side 283 and having an axis extending substantially perpendicular to the arm first side 281 and the arm second side 283.

The particular shape of the lift arm 237 is chosen suitable for a particular purpose. The goose-neck shape as shown in FIG. 11 is suitable to provide, such as, but not limited to, an extension of an attached door so as to clear structures of the automobile when the multi-axis automobile door hinge 201 is operated. Other shapes of the lift arm 237 are anticipated suitable for a particular purpose.

Referring again to FIG. 11, the arm second end 286 comprises a stepped hole in the form of an arm counter-bore 287 extending a predetermined distance from either the arm first side 281 or the arm second side 283 (as shown), depending on whether the third leaf 203 is for a left or right automobile door. The counter-bore 287 has a cylindrical shape having an axis substantially coaxial with the axis of the arm bore 288 and having a diameter larger than the arm bore 288 defining a bearing stop flange 289. The bearing stop flange 289 is adapted to couple with a bearing stop as discussed below. The bearing stop flange 289 comprises a plurality of bearing stop bores 279 arranged in a circular pattern substantially coaxial with the arm bore 288. The bearing stop bores 279 are adapted to align with stop block retention bores as discussed below.

The arm bore 288 is adapted to receive the lift hub 274 therein in substantially coaxial alignment therewith, the lift hub 274 being received from the side of the arm second end 286 that comprises the arm counter-bore 287. The arm bore 288 defines a second half of the lift bearing 269.

The mount plate 239 of the third leaf 230 is coupled to the hinge mount door surface 54 of the door edge 154 using any number of appropriate coupling means known in the art, including, but not limited to, welding, brazing, and mechanical fastening, such as, but not limited to, the embodiment as shown in FIG. 6C. The mount plate 239 is provided with a plurality of bolt holes (not shown) extending through the third leaf first side 233 to the third leaf second side 234, in predetermined locations that correspond to a bolt pattern provided in a hinge mount door surface 54 of the door edge 154 of one or more specific model of automobile after the removal of the conventional stock hinge. The third leaf 230 is coupled to the hinge mount door surface 54 with one or more bolts 29.

In another embodiment in accordance with the present invention, the mount plate 239 is adapted to be provided with a plurality of bolt holes (not shown), such as, but not limited to, those made by the consumer or assembler using a drill, in predetermined locations, through the third leaf first side 233 and the third leaf second side 234, that correspond to a bolt pattern provided in the hinge mount door surface 54 of the door edge 154 of a specific automobile 50 after the removal of the conventional stock hinge.

In another embodiment in accordance with the present invention, the mount plate 239 is adapted to be provided with a plurality of bolt holes (not shown), such as, but not limited to, those made by the consumer or assembler using a drill, in predetermined locations through the third leaf first side 233 and the third leaf second side 234 that correspond to a new bolt hole pattern provided in the hinge mount door surface 54 of the door edge 154.

In yet another embodiment in accordance with the present invention, the mount plate 239 is provided with a plurality of elongated bolt holes (not shown) in predetermined locations through the third leaf first side 233 and the third leaf second side 234 that correspond to one or more bolt patterns such as those provided in the hinge mount door surface 54 of the door edge 154 across one or more specific model of automobile after the removal of the conventional stock hinge. The elongated bolt holes (not shown) allow, among other things, for accommodation of mal-aligned bolt hole patterns and applicability across a plurality of models of automobile 50.

In another embodiment in accordance with the present invention, the mount plate 239 is provided with a plurality of bolt holes (not shown) in predetermined locations through the third leaf first side 233 and the third leaf second side 234 that correspond to a bolt pattern provided in a hinge mount door surface 54 of one or more specific model of automobile 50 after the removal of the conventional stock hinge, negating the need for the consumer or assembler to provide the bolt hole pattern in the mount plate 239.

Figure 12:
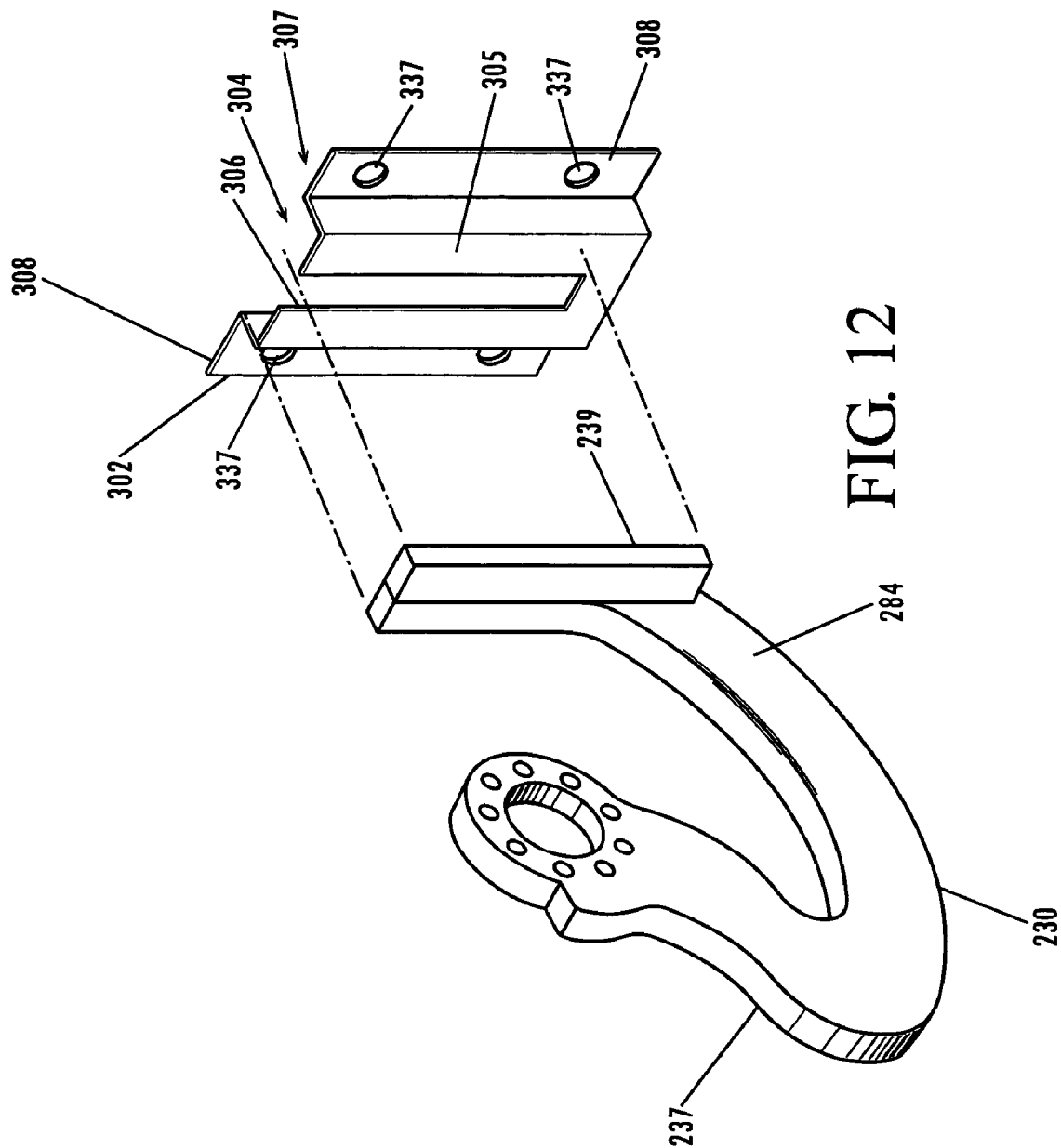
FIG. 12 is a perspective view of a mount bracket, in accordance with an embodiment of the present invention.

FIG. 12 is a perspective view of a mount bracket 302, in accordance with an embodiment of the present invention. The mount bracket 302 comprises a receiving flange 305 with mount flanges 308 extending therefrom. The receiving flange 305 defines a receiving pocket 304 with an opening 307 adapted to slidingly receive at least a portion of the mount plate 239 therein. The mount bracket 302 is provided with a receiving slot 306 adapted to receive the arm first end 284 therein. The mount bracket 302 is adapted to be coupled to a hinge mount door surface 54 of one or more specific model of automobile 50 after the removal of the conventional stock hinge. The mount bracket 302 provides for an easier assembly wherein a relatively small and light weight mount bracket 302 may be coupled to the hinge mount door surface 54 prior to the coupling of the third leaf 230, via the mount plate 239, to the mount bracket 302.

The mount bracket 302 is coupled to the hinge mount door surface 54 of the door edge 154 using any number of appropriate coupling means known in the art, including, but not limited to, welding, brazing, and mechanical fastening. In an embodiment in accordance with the present invention, the mount bracket 302 is provided with a plurality of bolt holes 337 extending through the mount flanges 308 in predetermined locations that correspond to a bolt pattern provided in a hinge mount door surface 54 of the door edge 154 of one or more specific model of automobile after the removal of the conventional stock hinge. The mount bracket 302 is coupled to the hinge mount door surface 54 with a plurality of bolts (not shown). One or more fasteners may be used to couple the mount plate 239 to the mount bracket 302 and/or the hinge mount door surface 54.

Figure 13A:
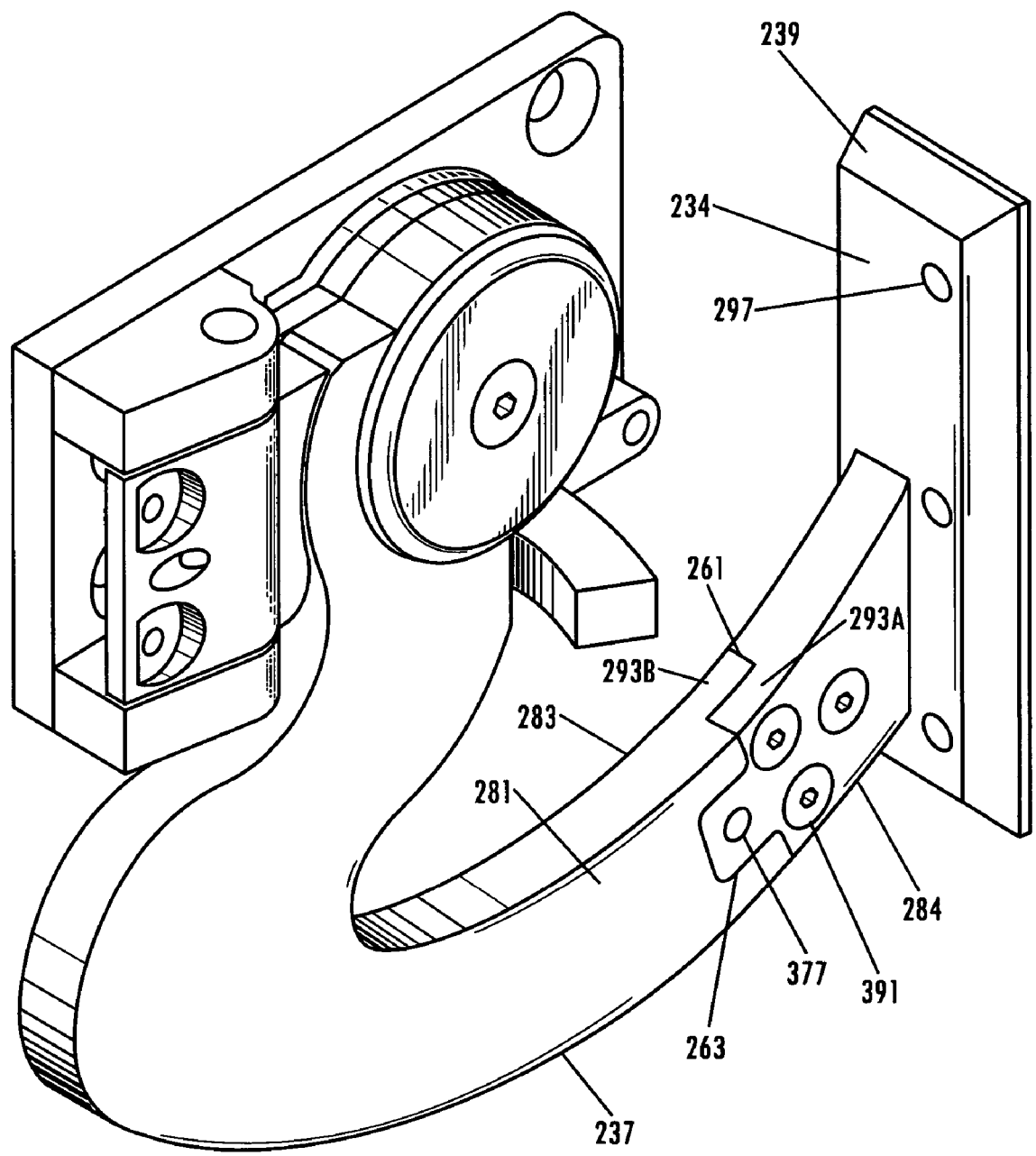
FIG. 13A is a perspective view of the arm first end of the lift arm sectioned at an arm joint at a location adjacent the third leaf second side so as to allow for the removable coupling of a substantial portion of the lift arm with the mount plate, in accordance with another embodiment of the present invention.

FIG. 13A is a perspective view of the arm first end 284 of the lift arm 237 sectioned at an arm joint 261 at a location adjacent the third leaf second side 234 so as to allow for the removable coupling of a substantial portion of the lift arm 237 with the mount plate 239, in accordance with another embodiment of the present invention. The arm joint 261 provides a removable coupling for an easier assembly wherein the relatively small and light weight mount plate 239 may be coupled to the hinge mount door surface 54 in any suitable manner prior to the coupling of a substantial portion of the lift arm 237, via the arm joint 261, to the mount plate 239.

Figure 13B:
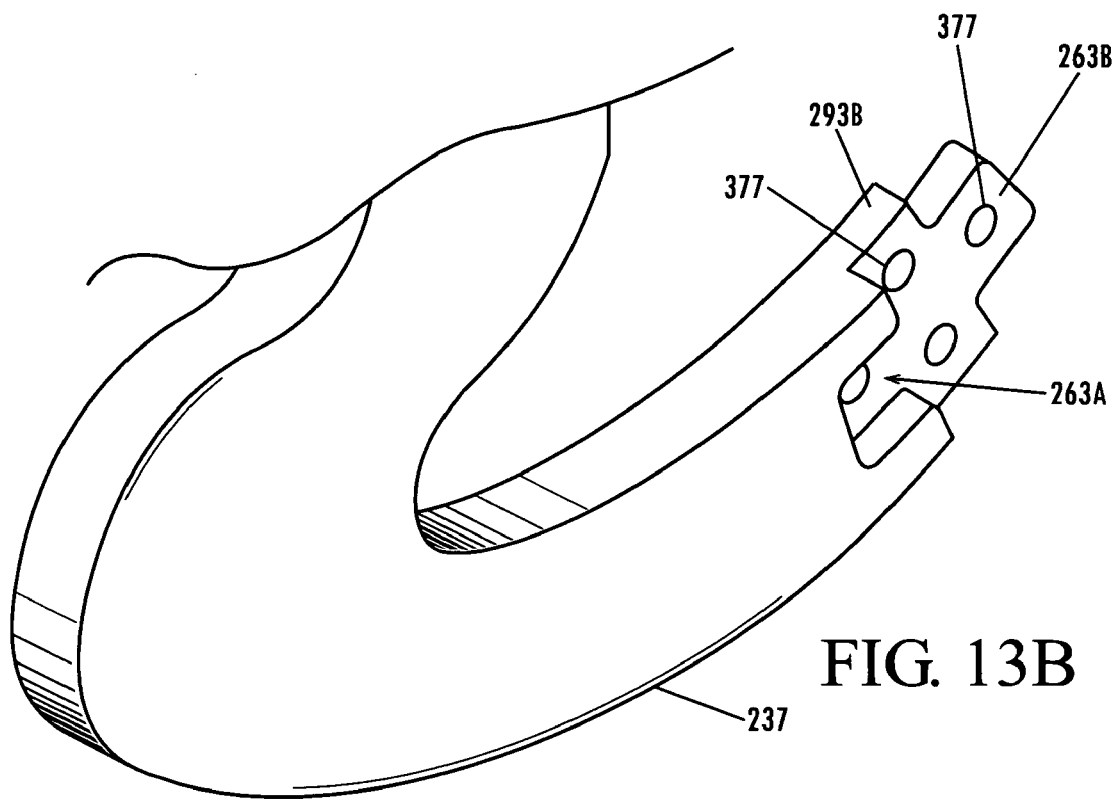
FIG. 13B is a perspective view of a portion of the arm first end comprising half of the arm joint of the embodiment of FIG. 13A.

FIG. 13B is a perspective view of a portion of the arm first end 284 comprising half of the arm joint 261 of the embodiment of FIG. 13A. The arm joint 261 comprises a modified half lap joint comprising corresponding notches 293A, 293B, that are notched half the thickness of the arm 237. The notches 293A, 293B are provided with threaded holes 377 and received by fasteners 391 to couple the lapped notches 293A, 293B. The notches 293A, 293B further comprise a mortise 263A and tenon 263B extending therein/therefrom with a threaded hole 377 for receiving a fastener providing additional strength and dimensional stability to the arm joint 261.

Figure 14:
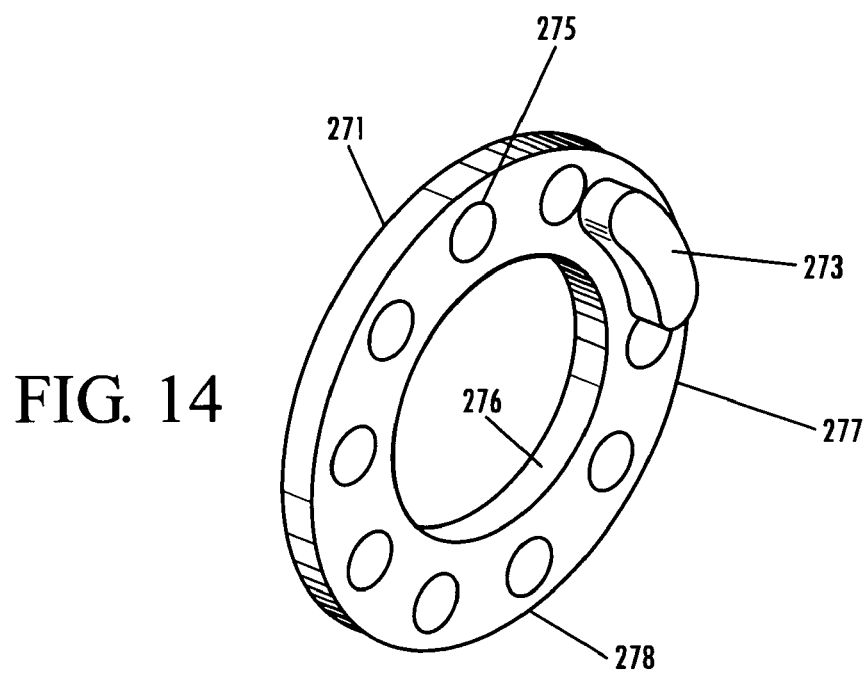
FIG. 14 is a rear perspective view of a lift rotation limiter comprising an engagement ring and a stop block, in accordance with an embodiment of the present invention.

FIG. 14 is a rear perspective view of a lift rotation limiter 278 comprising an engagement ring 271 and a stop block 273, in accordance with an embodiment of the present invention. Referring again to FIGS. 9C and 11, the engagement ring 271 has an outer diameter and a thickness adapted to be slidingly received within the counter-bore 287 and adjacent the bearing stop flange 289 of the arm second end 286. The engagement ring 271 further comprises a ring bore 276 adapted to slidingly receive the cylindrical lift hub 274 therethrough.

The engagement ring 271 further comprises a plurality of stop block retention bores 275 arranged in a circular pattern coaxial with the ring bore 276. The stop block retention bores 275 are adapted to slidingly receive one or more coupling nubs 262 extending from the stop block 273, as shown in FIG. 9C. The stop block 273 is coupled to the engagement ring 271 and adapted to be slidingly received within a portion of the semi-circular raceway 282 of the second leaf 220. One or more of the stop block retention bores 275 not occupied by the stop block coupling nubs 262 is received by a fastener so as to couple with the bearing stop bores 279 of the lift arm 237 to secure the lift rotation limiter 278 from rotating about the arm second end 286. The stop block 273 limits the minimum and maximum extent of rotation of the lift arm 237 relative to the second leaf 220 about the lift hub 274. The minimum and maximum extent of rotation of the lift arm 237 is selectable by positioning or repositioning the coupling nubs 262 of the stop block 273 in predetermined stop block retention bores 275.

The length of the stop block 273 and the raceway 282 further define the range of motion, minimum and maximum extent of rotation, about the lift hub 274. In other embodiments, multiple stop blocks 273 are used to define the range of motion about the lift hub 274.

It is appreciated that the available range of motion of the multi-axis automobile door hinge 201 as coupled to an automobile 50, minimum and maximum extent of rotation about the lift hub 274, and thus, the lift angle .beta., is limited only to the maximum extent in which the door 53 does not collide with the automobile body 51. The available range of motion of the multi-axis automobile door hinge 201 about the lift hub 274 itself is limited only to the collision of elements of the third leaf 230 with elements of the second leaf 220, which in the embodiment of FIG. 9B exceeds approximately 270 .degrees.

Referring again to FIGS. 9A and 9C, the multi-axis automobile door hinge 201 further comprises a cap 270 suitable for coupling the arm second end 286 to the lift hub 274. The cap 270 retains the arm second end 286 to the lift hub 274 by engagement of a fastener 291 passing through a through hole 292 in the cap 270 to threadably engage the threaded bore 277 in the lift hub 274.

Figure 15:
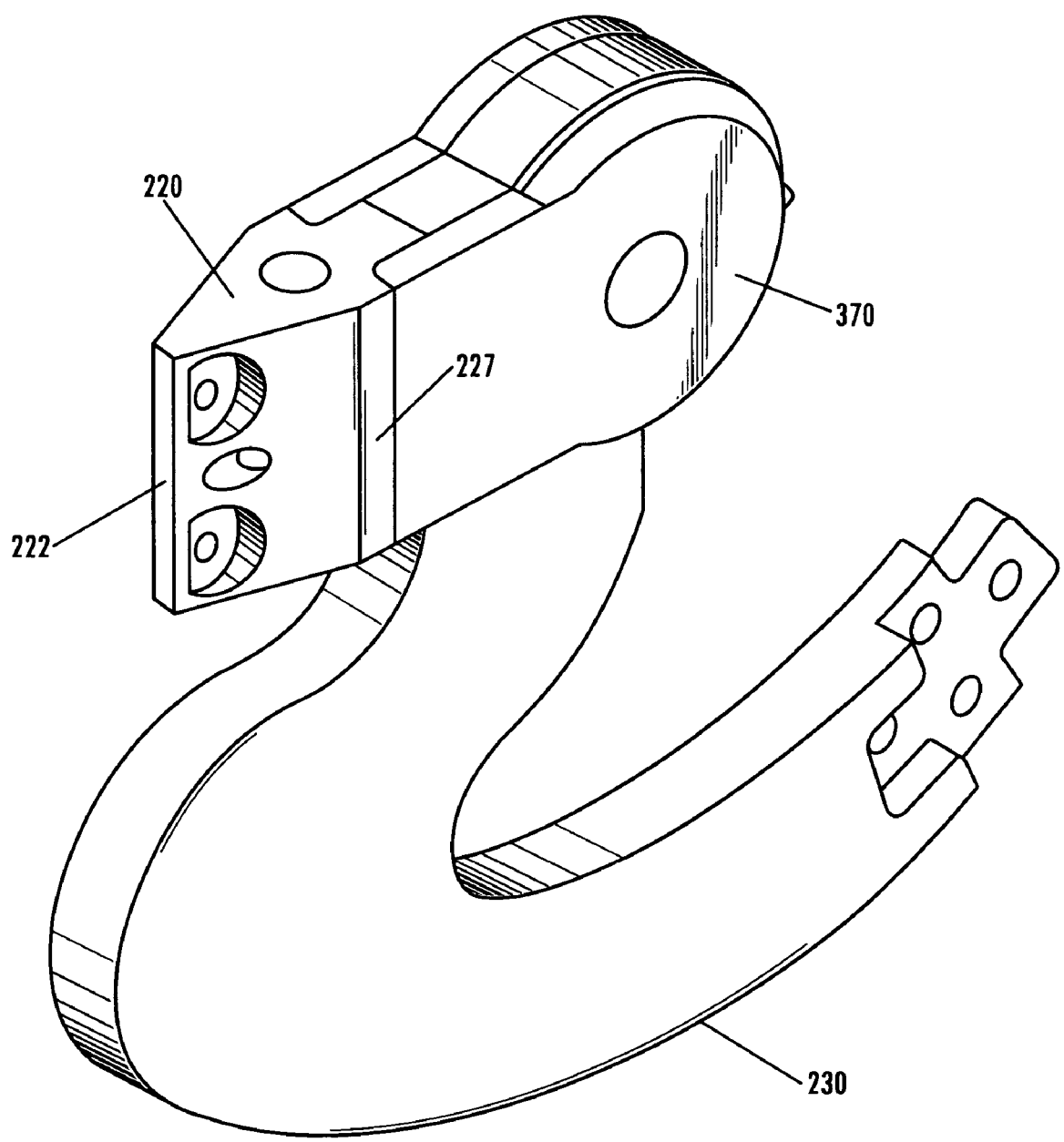
FIG. 15 is a perspective view of the second leaf and a portion of the third leaf of the multi-axis automobile door hinge comprising a cap suitable for coupling the arm second end to the lift hub, in accordance with an embodiment of the present invention.

FIG. 15 is a perspective view of the second leaf 220 and a portion of the third leaf 230 of the multi-axis automobile door hinge 201 comprising a cap 370 suitable for coupling the arm second end 286 to the lift hub 274, in accordance with an embodiment of the present invention. The cap 370 retains the arm second end 286 to the lift hub 274 by engagement of a fastener 291 passing through a through hole 292 in the cap 370 to threadably engage the threaded bore 277 in the lift hub 274, substantially similar to the cap 270 of FIG. 9C. The cap 370 is adapted to cover the arm second end 286 and a portion of the second leaf 220 adjacent the second swing knuckle 227. In this way, the cap 370 covers elements of the second leaf 220 and the third leaf 230 that come in close engagement that could pose a safety concern.

It is appreciated that there are a plurality of component modifications and changes suitable for a particular purpose. The previous and following specific embodiments highlight various elements that provide various control over the swing and lift of the multi-axis automobile door hinge. Though these embodiments show elements in specific combinations, it is appreciated that these and other elements can be used singularly and in combination suitable for a particular purpose.

Figure 16:
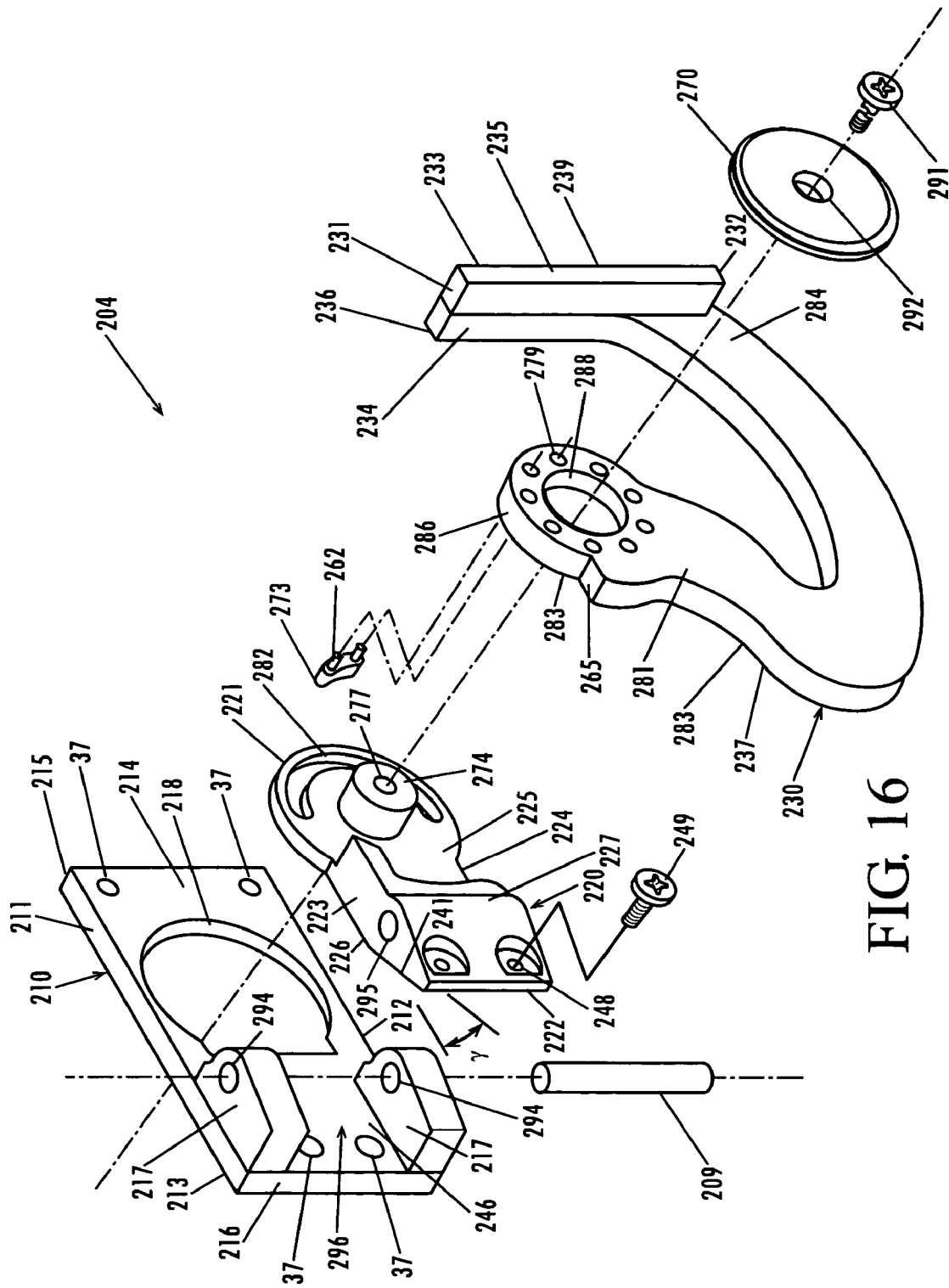
FIG. 16 is a side perspective exploded view of a multi-axis automobile door hinge, in accordance with an embodiment of the present invention.

FIG. 16 is a side perspective exploded view of a multi-axis automobile door hinge 204, in accordance with an embodiment of the present invention. The multi-axis automobile door hinge 204 is substantially similar to the multi-axis automobile door hinge 201 as shown in FIG. 9C, with the exception of the lift rotation limiter 278 comprising an engagement ring 271 and a stop block 273 and the arm second end 286 comprising a stepped hole in the form of an arm counter-bore 287. The function of the lift rotation limiter 278 of the embodiment of FIG. 9C is replaced with simply the stop block 273 in coupled engagement with a plurality of bearing stop bores 279 arranged in a circular pattern coaxial with the arm bore 288. The bearing stop bores 279 are adapted to slidingly receive one or more coupling nubs 262 extending from the stop block 273, as shown in FIG. 16.

Since there is no engagement ring 271 in this embodiment, the arm second end 286 does not necessarily comprise the arm counter-bore 287 shown in FIG. 11. The stop block 273 is coupled to the arm second end 286 and adapted to be slidingly received within a portion of the semi-circular raceway 282 of the second leaf 220. The stop block 273 limits the minimum and maximum extent of rotation of the lift arm 237 relative to the second leaf 220 about the lift hub 274. The minimum and maximum extent of rotation of the lift arm 237 is selectable by positioning or repositioning the coupling nubs 262 of the stop block 273 in predetermined bearing stop bores 279.

The predetermined length of the stop block 273 and the raceway 282 further define the range of motion, minimum and maximum extent of rotation, about the lift hub 274.

Figure 17:
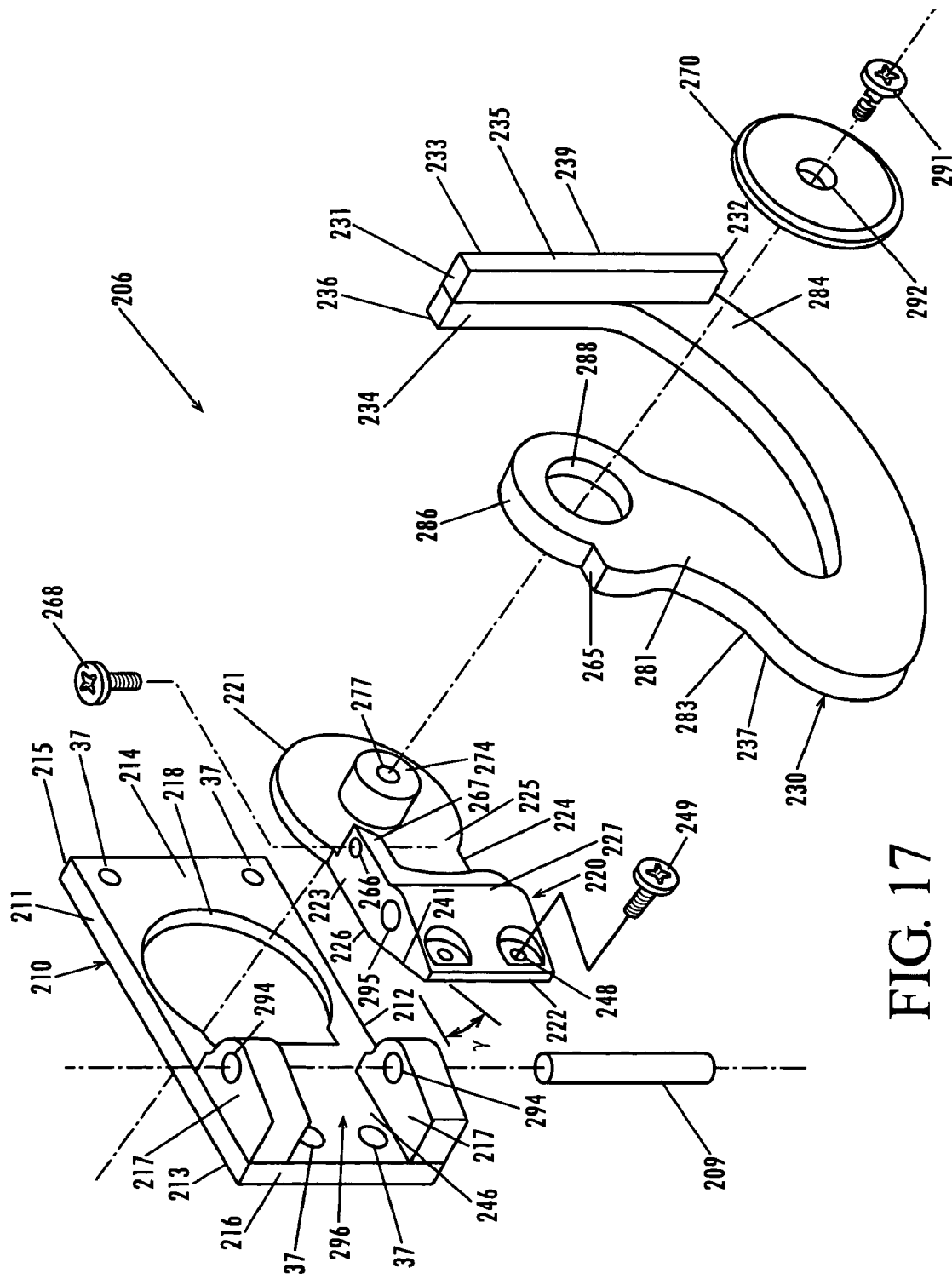
FIG. 17 is a side perspective exploded view of a multi-axis automobile door hinge, in accordance with an embodiment of the present invention.

FIG. 17 is a side perspective exploded view of a multi-axis automobile door hinge 206, in accordance with an embodiment of the present invention. The multi-axis automobile door hinge 206 is substantially similar to the multi-axis automobile door hinge 201 as shown in FIG. 9C, with the exception of the structural elements associated with lift rotation control. The lift rotation control of the embodiment shown in FIG. 9C comprises the semi-circular raceway 282 of the second leaf 220, the lift rotation limiter 278 comprising an engagement ring 271 and a stop block 273, and the arm second end 286 comprising an arm counter-bore 287 and bearing stop bores 279. The embodiment shown in FIG. 17 controls the minimum extent of rotation of the lift arm 237, also referred to as sag limiter, with elements provided on the second leaf 220 and third leaf 230.

The second leaf 220 further comprises a sag limiter rest 267 which partially defines the second leaf first edge 223 and extends from the second leaf first side 225 adjacent the second leaf first end 221. The sag limiter rest 267 comprises a threaded bore 266 extending from the second leaf first edge 223 towards the second leaf second edge 224. The threaded bore 266 is adapted to receive a suitable fastener 268, such as but not limited to a bolt and set screw, so as a portion of the fastener 268 extends beyond the sag limiter rest 267 and towards the second leaf second edge 224.

The third leaf 230 further comprises an engagement step 265 a predetermined location about the circumference of the arm second end 286. The engagement step 265 extends from the generally circular arm second end 286 a predetermined distance so as to engage the fastener 268 extending from the sag limiter rest 267 when the third leaf 230 is at a predetermined minimum lift angle .beta. to provide adjustability to the minimum lift angle .beta., as defined in FIG. 9B. The engagement and movement of fastener 268 about the threaded bore 266 allows for the adjustment of the fastener 268 to extend from the sag limiter rest 267 a predetermined distance so as to provide adjustability to the minimum lift angle .beta. of the third leaf 230, which is useful in adjusting the level of the door within the door frame of the automobile. The adjustment of the fastener 268 is easily performed by the user after the multi-axis automobile door hinge 206 is installed in an automobile.

Figure 18:
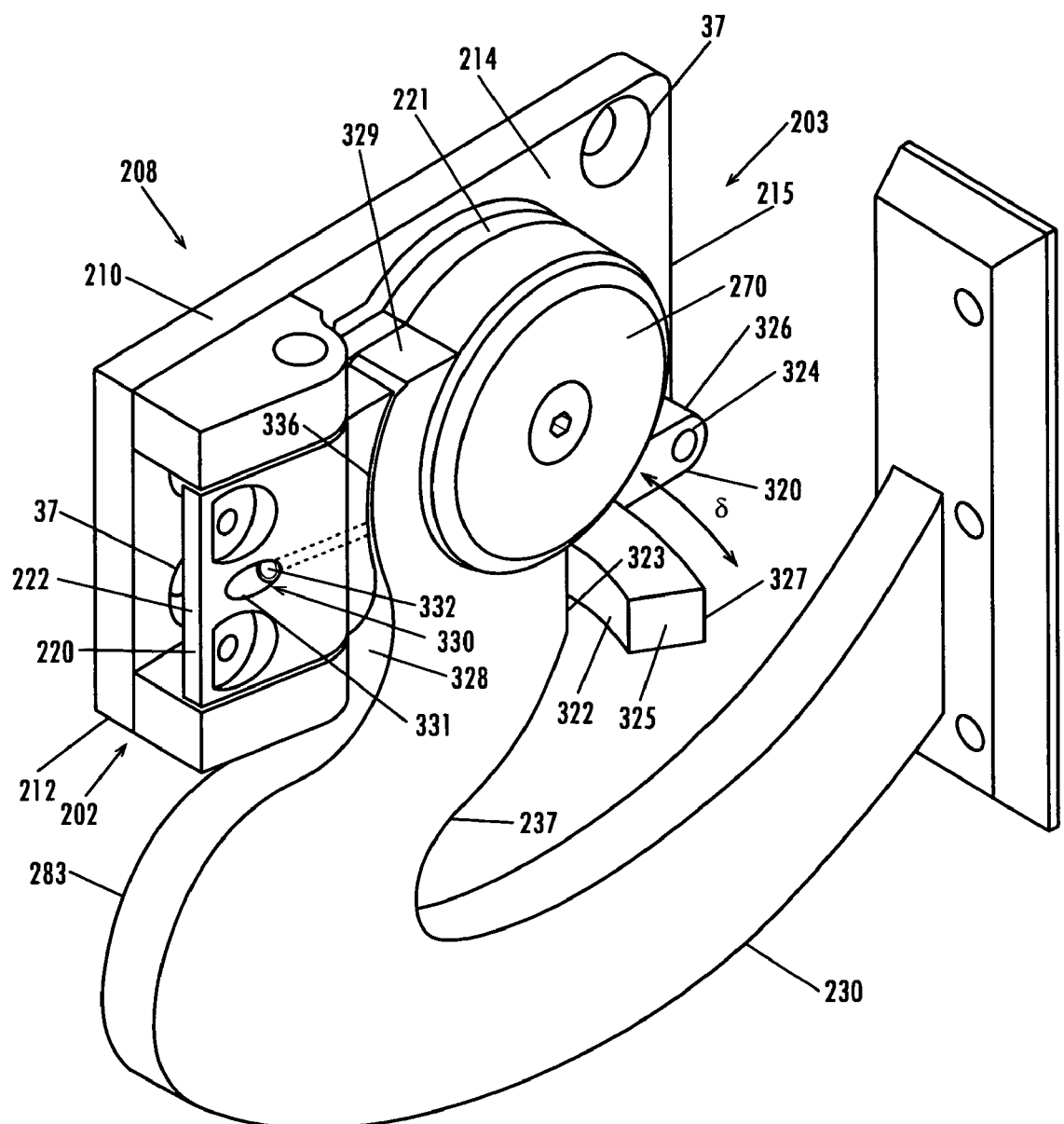
FIG. 18 is a side perspective view of a multi-axis automobile door hinge, in accordance with an embodiment of the present invention.

FIG. 18 is a side perspective view of a multi-axis automobile door hinge 208, in accordance with an embodiment of the present invention. The multi-axis automobile door hinge 208 is substantially similar to the multi-axis automobile door hinge 201 as shown in FIG. 9C, with the exception of some structural elements associated with swing and lift rotation control. The multi-axis automobile door hinge 208 further comprises a lift hinge retention element 320 adapted to restrict the vertical motion of the vertical-lift hinge 203 until the swing-out hinge 202 has opened to a predetermined angle .delta.

The lift hinge retention element 320 is an integral or coupled element that extends a predetermined distance, defining angle .delta., from the first leaf second side 214 adjacent the first leaf second edge 212 and the first leaf third edge 215. The lift hinge retention element 320 comprises a first engagement surface 322 adjacent the lift arm 237 when the lift arm 237 is in the down position and the second leaf 220 is in the closed position. The first engagement surface 322 is adapted for cooperative engagement with a first lift arm engagement surface 323 to restrict the function of the vertical-lift feature of the multi-axis automobile door mount 208 until the swing angle of the second hinge leaf 220 exceeds angle .delta., and the lift arm 237 clears the lift hinge retention element 320.

The lift hinge retention element 320 terminates at a second engagement surface 235. Once the third hinge leaf 230 exceeds angle .delta., the lift arm 237 is not subject to engagement with the first engagement surface 322 and is free to rotate vertically. When the lift arm 237 is in the rotated position, the lift arm 237 is prevented from moving to a swing angle less than angle .delta. by the cooperative engagement of the arm second side 283 and the second engagement surface 325.

In operation, the door 53 is opened initially from a closed position in the conventional swing-out rotation. At a predetermined swing-out angle .delta., or greater, of the door 53 to the automobile body 51, as shown in FIG. 3A, the lift arm 237 pivots clear of the lift hinge retention element 320, permitting a vertical rotation of the door 53 in an upward direction about the vertical-lift hinge 203, to a predetermined angle .beta. The door 53 is initially closed by vertically rotating the door 53 down from a lifted position. The lift hinge retention element 320 is adapted to prevent the downward rotation of the door 53 unless the door 53 is at, or greater than, the predetermined swing-out angle .delta. The door 53 is lowered to a substantially horizontal position where the lift arm 237 is clear of the lift hinge retention element 320 as the vertical-lift hinge 203 is fully closed. The door 53 is subsequently closed in the conventional swing-in manner.

In another embodiment in accordance with the present invention, the lift hinge retention element 320 comprises a third engagement surface 327 opposite the first engagement surface 322. The lift arm 237 is adapted to rotate upward to an angle .beta. such that the lift arm 237 rotates beyond and clear of the first engagement surface 322 and the second engagement surface 235. The third engagement surface 327 is adapted for cooperative engagement with a lift arm surface, such as, but not limited to, lift arm surface 328 and lift arm surface 329, when the third hinge leaf 230 is moved to a position less than angle .delta. while the lift arm 237 is in the up position. While in the up position and at an angle of less than angle .delta., the lift arm 237 engages the third engagement surface 327 restricting downward rotation of the third leaf 230. Thus, the lift hinge retention element 320 is adapted to retain the third leaf 230 in the up position.

The length of the lift hinge retention element 320 extending from the first leaf second side 214 determines, among other things, the minimum swing-out angle .delta. where the lift hinge retention element 320 disengages with the lift arm 237. A longer lift hinge retention element 320 will engage the lift arm 237 over a greater swing-out angle .delta. than would be provided by a shorter lift hinge retention element 320.

The multi-axis automobile door mount 208 requires an initial swing-out prior to enabling vertical-lift of the door 53, providing a number of advantages. These advantages include, but are not limited to, retaining the conventional swing-out operating characteristics associated with the initial opening and final closing movement of the door, and enabling the ability to accommodate many door shapes for vertical-lift operation.

Retaining the initial swing-out of the door provides that no modification to the stock latching and closing mechanism is required. Further, the integrity of the stock door sealing and weather stripping system is not compromised.

The initial swing-out of the door 53 also provides that all door structures will clear the automobile body 51 as the door 53 is vertically-lifted. This permits the incorporation of vertical door operation for automobiles with doors that have structures that would collide with the automobile body 51 if the door 53 were to be opened using a single-axis vertical-lift hinge. Such door structures include, but are not limited to, an undercut bottom door edge that wraps inwardly under the automobile body 51 that would collide with the door-jamb 152.

Referring again to FIG. 18, the second leaf 220 further comprises a sag limiter 330 comprising a threaded bore 331 and a suitable fastener 332. The sag limiter 330 controls the minimum extent of rotation of the lift arm 237. The threaded bore 331 extends from adjacent the second leaf second end 222 in a direction towards the second leaf first end 221. The threaded bore 331 is adapted to receive a suitable fastener 332, such as, but not limited to, a bolt and set screw, so that a portion of the fastener 332 extends beyond the sag limiter 330 for cooperative engagement with a lift arm surface 336 on the lift arm 237. The fastener 332 extends a predetermined distance so as to engage the lift arm surface 336 at a predetermined minimum lift angle .beta. to provide adjustability to the minimum lift angle .beta., as defined in FIG. 9B. The engagement and movement of fastener 332 about the threaded bore 331 allows for the adjustment of the fastener 332 to extend from the threaded bore 331 a predetermined distance so as to provide adjustability to the minimum lift angle .beta. of the third leaf 230, which is useful in adjusting the level of the door within the door frame of the automobile. The adjustment of the fastener 331 is easily performed by the user after the multi-axis automobile door hinge 208 is installed in an automobile.

In other embodiments in accordance with the present invention, the multi-axis automobile door hinge further comprises torsion control for the vertical lift hinge. Torsion control provides assistance in the operation of the lift arm by providing one or a combination of: return bias for returning the lift arm to the down position; retaining, counterbalancing or equilibrating the lift arm in any position between down and up when released by the user; and biasing the lift arm in the maximum up position. Embodiments of the multi-axis automobile door hinge, in accordance with the present invention, further comprise torsion control in the forms of springs, gas struts, and linear actuators, wherein the linear actuators can provide for powered operation.

Figure 19:
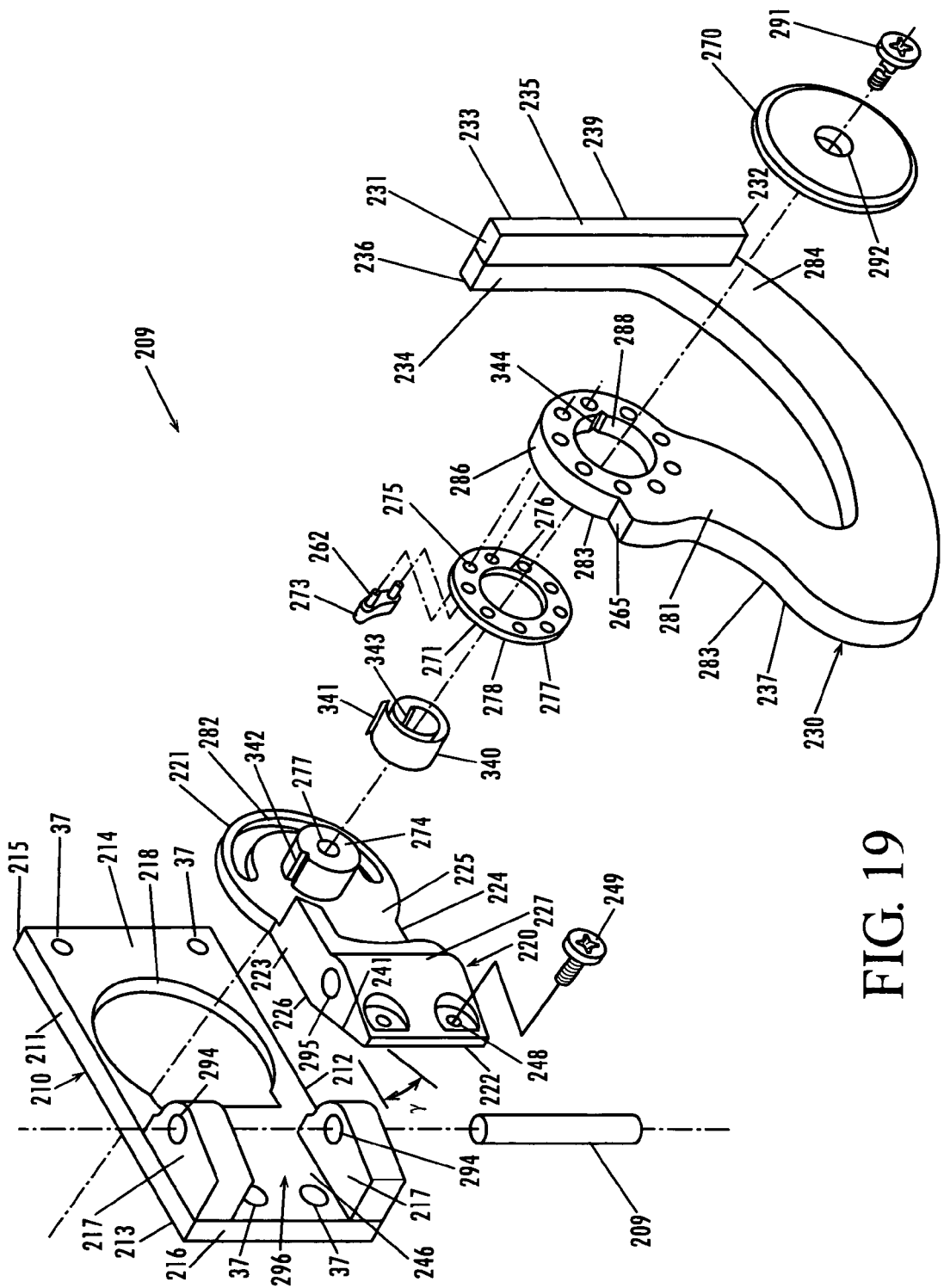
FIG. 19 is a side perspective exploded view of a multi-axis automobile door hinge further comprising a torsion spring, in accordance with an embodiment of the present invention.

FIG. 19 is a side perspective exploded view of a multi-axis automobile door hinge 209 further comprising a torsion spring 340, in accordance with an embodiment of the present invention. The torsion spring 340, a spiral spring is shown by way of example, comprises a hub engagement element 343 and an arm bore engagement element 341. The lift hub 274 further comprises a hub spring engagement element 342. The arm bore 288 of the lift arm 237 further comprises an arm spring engagement element 344. The torsion spring 340 is adapted to be received over at least a portion of the lift hub 274 with the hub engagement element 343 in cooperative engagement with the hub spring engagement element 342. The torsion spring 340 is also adapted to be received within at least a portion of the arm bore 288 with the arm bore engagement element 341 in cooperative engagement with the arm spring engagement element 344. The torsion spring 340 is adapted to be substantially contained within a space defined by the lift hub 274 and the arm bore 288. The direction of the bias of the torsion spring 340 is determined suitable for a particular purpose. The torsion spring 340 provides a predetermined function of one or a combination of: return bias for returning the lift arm 237 to the down position; retaining, counterbalancing or equilibrating the lift arm 237 in any position between down and up when released by the user; and biasing the lift arm 237 in the maximum up position.

Figure 20:
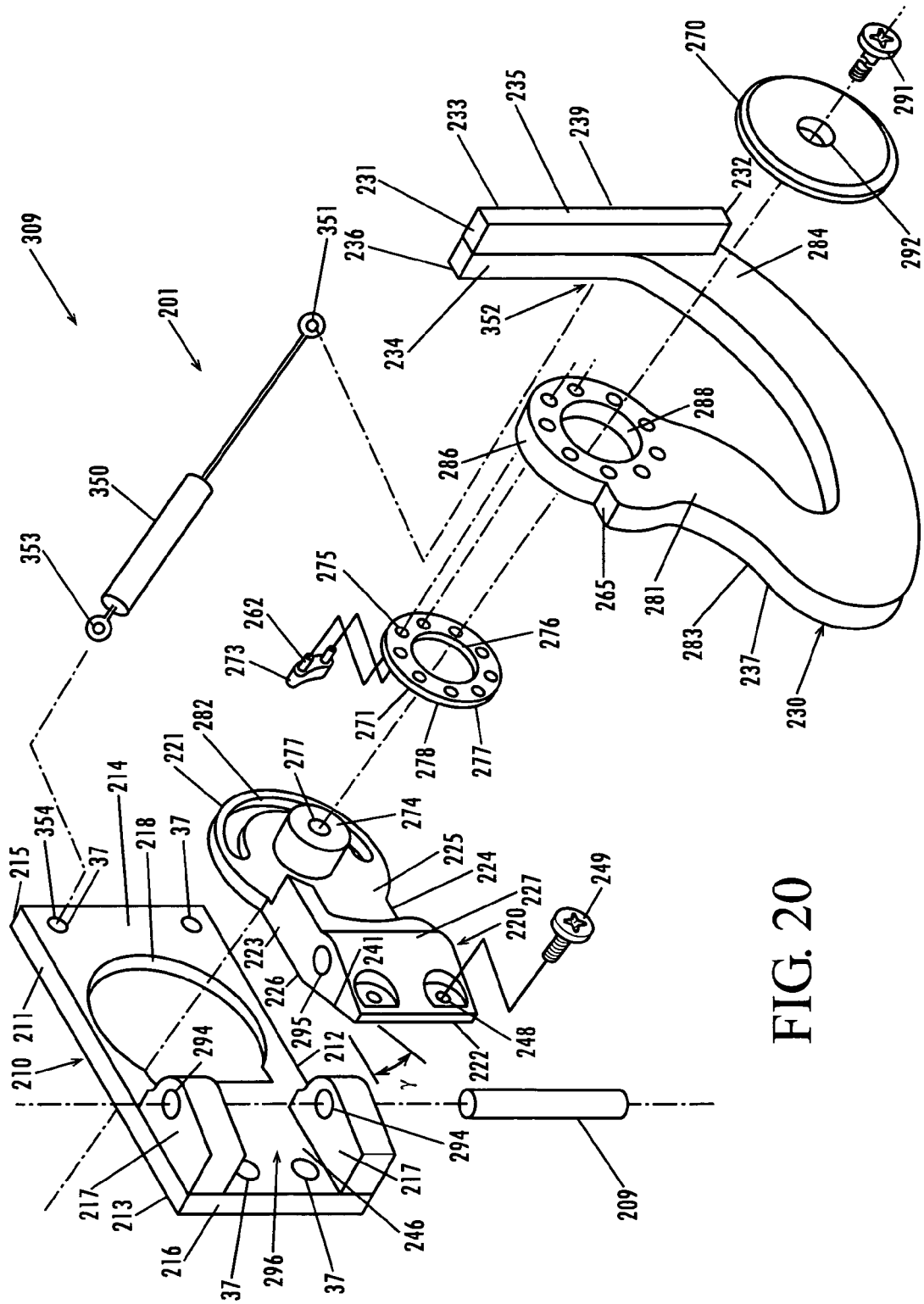
FIG. 20 is a side perspective exploded view of a multi-axis automobile door hinge further comprising a gas strut, in accordance with an embodiment of the present invention.

FIG. 20 is a side perspective exploded view of a multi-axis automobile door hinge 309 further comprising a gas strut 350, in accordance with an embodiment of the present invention. The gas strut 350 comprises a first leaf engagement element 353 and a third leaf engagement element 351. The first leaf 210 further comprises a first strut engagement element 354, shown in this embodiment, by way of example, as one of the through bore 37 to be fastened by a suitable fastener (not shown). The lift arm 237 further comprises an second strut engagement element 352 (not shown). The first leaf engagement element 353 is adapted to be coupled to the first strut engagement element 354 and the third leaf engagement element 351 is adapted to be coupled to the second strut engagement element 352. Cooperative engagement of the gas strut 350 and the first leaf 210 and the third leaf 230 provides a predetermined function of one or a combination of: return bias for returning the lift arm 237 to the down position; retaining, counterbalancing or equilibrating the lift arm 237 in any position between down and up when released by the user; and biasing the lift arm 237 in the maximum up position.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed:

1. A multi-axis automobile door hinge, comprising:
a hinge pin;
a first leaf comprising:
a first leaf first edge;
a first leaf second edge opposite the first leaf first edge;
a first leaf first side;
a first leaf second side opposite the first leaf first side;
a first leaf third edge;
a first leaf fourth edge opposite the first leaf third edge; and
two spaced apart first swing knuckles extending from the first leaf second side adjacent the first leaf fourth edge defining a swing notch there between, the first swing knuckles each define a first swing knuckle bore there through, the axis of the first swing knuckle bores are in substantially coaxial alignment and define a substantially vertical axis;
a second leaf comprising:
a second leaf first end;
a second leaf second end opposite the second leaf first end;
a second leaf first edge;
a second leaf second edge opposite the second leaf first edge;
a second leaf first side;
a second leaf second side opposite the second leaf first side, the second leaf second end comprising a second swing knuckle bore extending between the second leaf first edge and the second leaf second edge defining a second swing knuckle, the second swing knuckle is adapted to be received within the swing notch of the first leaf with the axis of the first swing knuckle bores and second swing knuckle bore in substantially coaxial alignment, the hinge pin received within the first swing knuckle bores and the second swing knuckle bore pivotally coupling the second leaf to the first leaf defining a swing-out hinge; and
a cylindrical lift hub extending substantially perpendicular from the second leaf first side adjacent the second leaf first end and defining an axis substantially perpendicular to the second swing knuckle bore, the lift hub defining a first half of a lift bearing; and
a third leaf comprising:
a third leaf first end;
a third leaf second end opposite the third leaf first end;
a third leaf first side;
a third leaf second side opposite the third leaf first side;
a third leaf first edge;
a third leaf second edge opposite the third leaf first edge, the third leaf first and second end, the third leaf first and second side, and the third leaf first and second edge defining a mount plate; and
a lift arm extending from the third leaf second side adjacent the third leaf second end, the lift arm comprising an arm first end coupled with the third leaf second side and an arm second end opposite the arm first end, the lift arm comprising an arm first side and an arm second side opposite the arm first side, the arm second end comprising an arm bore extending from the arm first side to the arm second side and having an axis extending substantially perpendicular to the arm first side, the arm bore adapted to receive the lift hub therein in substantially coaxial alignment therewith, the arm bore defining a second half of the lift bearing, the second leaf pivotally coupled to the third leaf about the lift bearing defining a vertical-lift hinge.

2. The hinge of claim 1, the lift arm comprising a generally goose-neck shape.

3. The hinge of claim 2, further comprising a lift rotation limiter comprising:
a stop block having at least one coupling nub extending from a side of the stop block;
the arm second end further comprising a plurality of stop block retention bores arranged in a circular pattern coaxial with the arm bore, the stop block retention bores adapted to slidingly receive one or more coupling nubs extending from the stop block; and
the second leaf first end comprising a recessed portion defining a semi-circular raceway that is substantially coaxial with and spaced a predetermined distance from the lift hub, the stop block adapted to be slidingly received within a portion of the semi-lift circular raceway of the second leaf, the stop block adapted to limit the minimum and maximum extent of rotation of the lift arm relative to the second leaf about the lift hub, a length of the stop block and the raceway is predetermined to define a minimum and maximum extent of rotation about the lift hub.

4. The hinge of claim 2, further comprising a lift rotation limiter comprising:
a stop block having at least one coupling nub extending from a side of the stop block;
the arm second end further comprising an arm counter-bore extending a predetermined distance from the arm first side, the counter-bore having a cylindrical shape having an axis substantially coaxial with the axis of the arm bore and having a diameter larger than the arm bore defining a bearing stop flange, the bearing stop flange comprising a plurality of bearing stop bores arranged in a circular pattern substantially coaxial with the arm bore, the stop block retention bores adapted to slidingly receive one or more coupling nubs extending from the stop block;
an engagement ring having an outer diameter and a thickness adapted to be slidingly received within the counter-bore and adjacent the bearing stop flange of the arm second end, the engagement ring further comprising a ring bore adapted to slidingly receive the cylindrical lift hub there through, the engagement ring further comprising a plurality of stop block retention bores arranged in a circular pattern coaxial with the ring bore, the bearing stop bores adapted to align with the stop block retention bores, one or more stop block retention bores not occupied by the coupling nubs is received by a fastener so as to couple with the bearing stop bores of the lift arm to couple the engagement ring to the arm second end; and
the second leaf first end comprising a recessed portion defining a semi-circular raceway that is substantially coaxial with and spaced a predetermined distance from the lift hub, the stop block adapted to be slidingly received within a portion of the semi-circular raceway of the second leaf, the stop block adapted to limit the minimum and maximum extent of rotation of the lift arm relative to the second leaf about the lift hub, a length of the stop block and the raceway is predetermined to define a minimum and maximum extent of rotation about the lift hub.

5. The hinge of claim 2, further comprising a cap and a fastener, the cap having a through hole there through, the lift hub further comprising a threaded bore to receive the fastener therein, the cap adapted for coupling the arm second end to the lift hub by engagement of the fastener passing through the through hole to threadably engage the threaded bore in the lift hub.

6. The hinge of claim 2, the first leaf further comprising a recessed portion extending a predetermined distance into the first leaf second side, the recessed portion adapted to receive a portion of the second leaf first end therein.

7. The hinge of claim 2, the first leaf further a through hole extending from the first leaf second side to the first leaf first side, the through hole adapted to receive a portion of the second leaf first end therein.

8. The hinge of claim 2, the second leaf second end comprising a bevel portion defined therein, the bevel portion substantially facing the first leaf and adapted to prevent rotation of the second leaf greater than a predefined bevel angle by the impingement of the bevel portion with a bevel impact surface on the first leaf second side adjacent the first leaf fourth edge.

9. The hinge of claim 8, the second leaf second end defining one or more threaded swing-limiting bores extending through to the bevel portion and having axes extending substantially perpendicular with the bevel portion, end portions of suitable fasteners adapted to be received by the threaded swing-limiting bores and extend beyond the bevel portion to contact the bevel impact surface when the second leaf is at a predetermined swing angle to provide adjustability to the maximum swing angle.

10. The hinge of claim 2, the mount plate comprising a plurality of bolt holes extending through the third leaf first side to the third leaf second side in predetermined locations.

11. The hinge of claim 2, further comprising a mount bracket comprising a receiving flange with mount flanges extending therefrom, the receiving flange defining a receiving pocket with an opening adapted to slidingly receive at least a portion of the mount plate therein, the mount bracket defining a receiving slot adapted to receive the arm first end therein.

12. The hinge of claim 2, the arm first end of the lift arm being sectioned at an arm joint at a location adjacent the third leaf second side so as to allow for the removable coupling of a substantial portion of the lift arm and the mount plate.

13. The hinge of claim 12, wherein the arm joint comprises a modified half lap joint comprising corresponding notches that are notched half the thickness of the arm, the notches comprising threaded holes and received by fasteners to couple the notches when lapped.

14. The hinge of claim 13, the notches further comprise a mortise and tenon extending therein/therefrom, the mortise and tenon having a threaded hole for receiving a fastener therein.

15. The hinge of claim 2, the second leaf further comprising a sag limiter rest which partially defines the second leaf first edge and extends from the second leaf first side adjacent the second leaf first end, the sag limiter rest comprising a threaded bore extending from the second leaf first edge towards the second leaf second edge, the threaded bore adapted to receive a suitable fastener so as a portion of the fastener extends beyond the sag limiter rest and towards the second leaf second edge, the third leaf further comprising an engagement step a predetermined location adjacent the arm second end, the engagement step extends from adjacent the arm second end a predetermined distance so as to engage the fastener extending from the sag limiter rest when the third leaf is at a predetermined minimum lift angle to provide adjustability to the minimum lift angle, the engagement and movement of fastener about the threaded bore adapted for the adjustment of the fastener to extend from the sag limiter rest a predetermined distance so as to provide adjustability to the minimum lift angle of the third leaf.

16. The hinge of claim 2, the second leaf further comprising a sag limiter comprising a threaded bore and a fastener, the threaded bore extending from adjacent the second leaf second end in a direction towards the second leaf first end, the threaded bore adapted to receive the fastener therein, the fastener extending a predetermined distance beyond the sag limiter so as to engage the lift arm surface on the lift arm at a predetermined minimum lift angle.

17. The hinge of claim 2, further comprising a lift hinge retention element adapted to restrict the vertical motion of the vertical-lift hinge until the swing-out hinge has opened equal to or greater than a predetermined angle .delta., the lift hinge retention element extending a predetermined distance from the first leaf second side adjacent the first leaf second edge and the first leaf third edge defining angle .delta., the lift hinge retention element comprising a first engagement surface adjacent the lift arm when the lift arm is in the down position, the first engagement surface adapted for cooperative engagement with a first lift arm engagement surface to restrict the function of the vertical-lift hinge until the swing angle of the second hinge leaf exceeds the predetermined angle .delta., the lift hinge retention element terminating at a second engagement surface adapted for cooperative engagement with the lift arm when the swing angle of the second leaf is at the predetermined angle .delta. and the lift arm is rotated greater than a minimum lift angle .beta., so as to restrict the function of the swing hinge when the lift arm is pivoted greater than the minimum lift angle .beta.

18. The hinge of claim 17, the lift hinge retention element further comprising a third engagement surface opposite the first engagement surface, the third engagement surface adapted such that when the lift arm is rotated a predetermined angle .beta. or more and the second leaf is pivoted a predetermined angle .delta. or less, the lift arm and the third engagement surface are adapted for cooperative engagement to restrict the third leaf from rotating down to less than the predetermined angle .beta.

19. The hinge of claim 2, further comprising torsion control means for the vertical lift hinge adapted to provide assistance in the operation of the lift arm by providing one or a combination of: return bias for returning the lift arm to the down position; retaining, counterbalancing or equilibrating the lift arm in any position between down and up when released by the user; and biasing the lift arm in the maximum up position.

20. The hinge of claim 2, further comprising a torsion spring comprising a hub engagement element and an arm bore engagement element, the lift hub further comprising a hub spring engagement element, the arm bore of the lift arm further comprising an arm spring engagement element, the torsion spring adapted to be received over at least a portion of the lift hub with the hub engagement element in cooperative engagement with the hub spring engagement element, the torsion spring adapted to be received within at least a portion of the arm bore with the arm bore engagement element in cooperative engagement with the arm spring engagement element, the torsion spring adapted to be substantially contained within a space defined by the lift hub and the arm bore.

21. The hinge of claim 2, further comprising a gas strut comprising a first leaf engagement element and an arm engagement element, the first leaf further comprising a first strut engagement element, the lift arm further comprising a second strut engagement element, the first leaf engagement element adapted to be coupled to the first strut engagement element and the arm engagement element adapted to be coupled to the second strut engagement element.

22. The hinge of claim 2, further comprising a linear actuator comprising a first leaf engagement element and an arm engagement element, the first leaf further comprising a first linear actuator engagement element, the lift arm further comprising a second linear actuator engagement element, the first leaf engagement element adapted to be coupled to the first linear actuator engagement element and the arm engagement element adapted to be coupled to the second linear actuator engagement element, the linear actuator adapted for powered operation of the hinge.

23. The hinge of claim 2, further comprising a mounting plate, the first leaf adapted to couple to the mounting plate.

* * * * *